US010296586B2

(12) United States Patent
Singh et al.

(10) Patent No.: US 10,296,586 B2
(45) Date of Patent: May 21, 2019

(54) PREDICTING HUMAN BEHAVIOR BY MACHINE LEARNING OF NATURAL LANGUAGE INTERPRETATIONS

(71) Applicant: SoundHound, Inc., Santa Clara, CA (US)

(72) Inventors: Pranav Singh, Santa Clara, CA (US); Bernard Mont-Reynaud, Sunnyvale, CA (US); Kheng Khov, Santa Clara, CA (US); Jonah Probell, Aliviso, CA (US)

(73) Assignee: SoundHound, Inc., Santa Clara, CA (US)

( * ) Notice: Subject to any disclaimer, the term of this patent is extended or adjusted under 35 U.S.C. 154(b) by 112 days.

(21) Appl. No.: 15/425,099

(22) Filed: Feb. 6, 2017

(65) Prior Publication Data

US 2018/0182381 A1 Jun. 28, 2018

Related U.S. Application Data

(60) Provisional application No. 62/438,731, filed on Dec. 23, 2016.

(51) Int. Cl.
*G10L 15/00* (2013.01)
*G10L 15/18* (2013.01)
(Continued)

(52) U.S. Cl.
CPC .......... *G06F 17/2785* (2013.01); *G06F 16/00* (2019.01); *G06F 16/29* (2019.01);
(Continued)

(58) Field of Classification Search
CPC .......... G06F 17/2785; G06F 17/30241; G06F 17/30; G06F 17/2775; G06F 17/3087;
(Continued)

(56) References Cited

U.S. PATENT DOCUMENTS

| 7,328,201 B2 * | 2/2008 | D'Ambrosio .......... G06Q 30/02 706/45 |
| 7,999,857 B2 * | 8/2011 | Bunn ...................... G10L 15/25 348/143 |

(Continued)

FOREIGN PATENT DOCUMENTS

EP 1646037 A2 4/2006

OTHER PUBLICATIONS

Aiello LM et al, "Quercia D, Aletta F. 2016 Chatty maps: constructing sound maps of urban areas from social media data.", R. Soc. open sci. 3: 150690, Feb. 2016, 19 pages (downloaded from http://dx.doi.org/10.1098/rsos.150690).

(Continued)

*Primary Examiner* — Edwin S Leland, III
(74) *Attorney, Agent, or Firm* — Haynes Beffel & Wolfeld LLP; Ernest J. Beffel, Jr.; Andrew L. Dunlap

(57) ABSTRACT

An accurate thought map is created by recording people's many utterances of natural language expressions together with the location at which each expression was made. The expressions are input into a Natural Language Understanding system including a semantic parser, and the resulting interpretations stored in a database with the geolocation of the speaker. Emotions, concepts, time, user identification, and other interesting information may also be detected and stored. Interpretations of related expressions may be linked in the database. The database may be indexed and filtered according to multiple aspects of interpretations such as geolocation ranges, time ranges or other criteria, and analyzed according to multiple algorithms. The analyzed results may be used to render map displays, determine effective locations for advertisements, preemptively fetch information for users of mobile devices, and predict the behavior of individuals and groups of people.

7 Claims, 16 Drawing Sheets

(51) Int. Cl.
*G10L 25/63* (2013.01)
*G06F 17/27* (2006.01)
*G06Q 30/02* (2012.01)
*G06F 16/00* (2019.01)
*G06F 16/29* (2019.01)
*G06F 16/9537* (2019.01)

(52) U.S. Cl.
CPC ...... *G06F 16/9537* (2019.01); *G06F 17/2775* (2013.01); *G06Q 30/02* (2013.01)

(58) Field of Classification Search
CPC ......... G10L 15/18; G10L 15/00; G10L 25/63; G06Q 30/02
USPC ............................................................ 704/9
See application file for complete search history.

(56) References Cited

U.S. PATENT DOCUMENTS

| | | | | |
|---|---|---|---|---|
| 9,166,823 | B2* | 10/2015 | Karmarkar | H04L 51/38 |
| 9,378,740 | B1* | 6/2016 | Rosen | G10L 15/1822 |
| 2004/0076279 | A1* | 4/2004 | Taschereau | G06Q 30/0241 |
| | | | | 379/218.01 |
| 2004/0243417 | A9* | 12/2004 | Pitts, III | G06Q 10/06 |
| | | | | 704/276 |
| 2005/0149516 | A1* | 7/2005 | Wolf | G06F 16/3343 |
| 2006/0116987 | A1* | 6/2006 | Bernard | G10L 15/26 |
| 2008/0010259 | A1* | 1/2008 | Feng | G06F 16/9537 |
| 2010/0086107 | A1* | 4/2010 | Tzruya | H04M 3/2281 |
| | | | | 379/88.01 |
| 2012/0253802 | A1* | 10/2012 | Heck | G10L 15/20 |
| | | | | 704/235 |
| 2012/0296643 | A1* | 11/2012 | Kristjansson | G10L 21/0208 |
| | | | | 704/226 |
| 2013/0138424 | A1* | 5/2013 | Koenig | G06F 17/271 |
| | | | | 704/9 |
| 2013/0211843 | A1* | 8/2013 | Clarkson | G06F 3/017 |
| | | | | 704/275 |
| 2014/0195234 | A1* | 7/2014 | Singleton | G10L 15/08 |
| | | | | 704/246 |
| 2014/0236916 | A1* | 8/2014 | Barrington | G06Q 10/10 |
| | | | | 707/706 |
| 2015/0163561 | A1* | 6/2015 | Grevers, Jr. | H04N 21/812 |
| | | | | 704/235 |
| 2015/0340033 | A1* | 11/2015 | Di Fabbrizio | G10L 15/18 |
| | | | | 704/254 |
| 2015/0348569 | A1* | 12/2015 | Allam | G10L 25/48 |
| | | | | 704/257 |
| 2016/0188292 | A1* | 6/2016 | Carter | G06F 3/167 |
| | | | | 704/257 |
| 2016/0314786 | A1* | 10/2016 | Byrne | G10L 15/22 |
| 2017/0011026 | A1* | 1/2017 | Byron | G06F 16/3329 |
| 2017/0140041 | A1* | 5/2017 | Dotan-Cohen | G06Q 10/04 |
| 2017/0180336 | A1* | 6/2017 | Josephson | G06F 21/32 |
| 2017/0199721 | A1* | 7/2017 | Ivanov | G06F 3/167 |
| 2018/0174020 | A1* | 6/2018 | Wu | G06N 3/006 |
| 2018/0182381 | A1* | 6/2018 | Singh | G06F 17/2775 |
| 2018/0358021 | A1* | 12/2018 | Mistica | G10L 15/22 |

OTHER PUBLICATIONS

Blaylock N. et al, "Street-Level Geolocation From Natural Language Descriptions", TAL. vol. 53, No. 2/2012, 29 pages.

"The power of learning", The Economist, 2 pages, Aug. 22, 2016, downloaded from http://www.economist.com/news/leaders/21705318-clever-computers-could-transform-government-power-learning.

Fischer, Eric. Making the most detailed tweet map ever; MapBox.com, 5 pages, Jul. 25, 2016, downloaded from https://www.mapbox.com/blog/twitter-map-every-tweet/.

Hsieh et al, "What Makes New York So Noisy? Reasoning Noise Pollution by Mining Multimodal Geo-Social Big Data", Proceedings of ACM MM '15, Oct. 2015, 4 pages, ACM 978-1-4503-3459-4/15/10.

Kaneko T. et al, "Event photo mining from Twitter using keyword bursts and image clustering", Neurocomputing (2015), Feb. 7, 2015, 16 pages, downloaded from http://dx.doi.org/10.1016/j.neucom.2015.02.081i.

Quercia, D. et al, "Smelly Maps: The Digital Life of Urban Smellscapes", Proceedings of the 9th International AAAI Conference on Web and Social Media, 2015, 10 pages.

Steinfield, C., "The Development of Location Based Services in Mobile Commerce", Michigan State University, 15 pages, downloaded from https://msu.edu/~steinfie/elifelbschap.pdf.

* cited by examiner

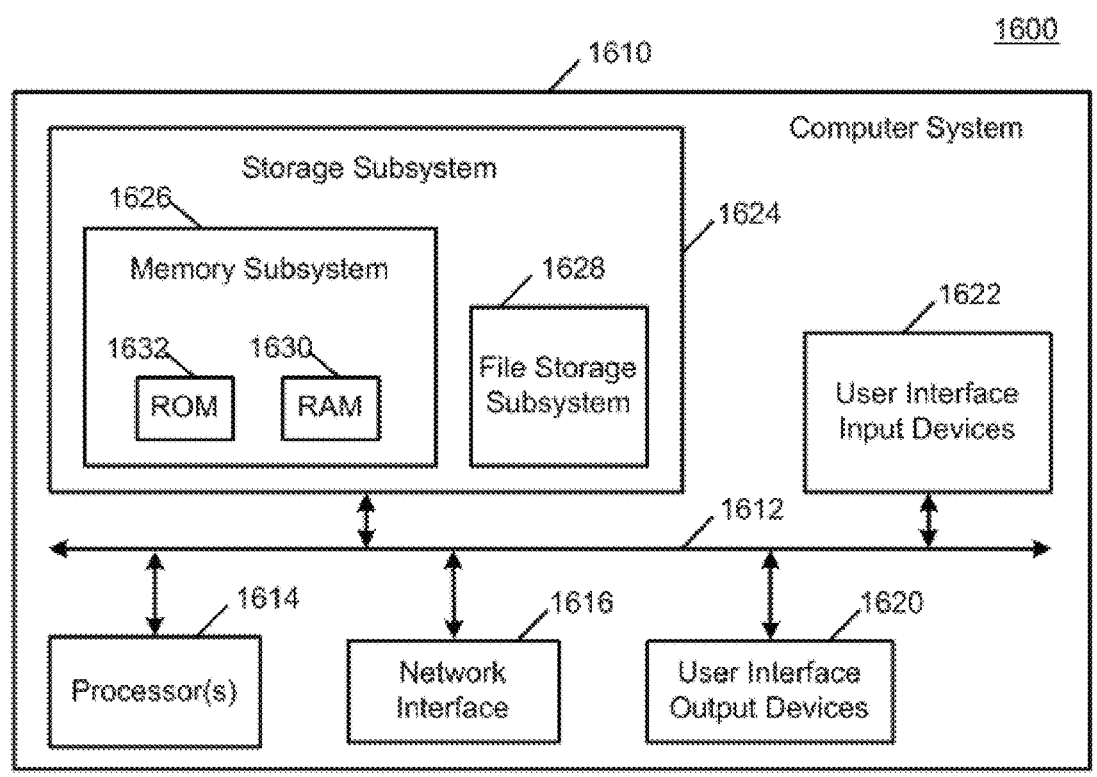
FIG. 16 – Computer System

PREDICTING HUMAN BEHAVIOR BY MACHINE LEARNING OF NATURAL LANGUAGE INTERPRETATIONS

REFERENCE TO RELATED APPLICATIONS

This application claims priority to U.S. Provisional Patent Application No. 62/438,731 filed on Dec. 23, 2016 by Pranav Singh, Bernard Mont-Reynaud, Kheng Khov, and Jonah Probell, and entitled GEOGRAPHICAL MAPPING OF INTERPRETATIONS OF NATRUAL LANGUAGE EXPRESSIONS, which is incorporated herein by reference in its entirety.

FIELD OF THE INVENTION

The present invention is in the field of creating regional maps indicating an aggregation of concepts included in thoughts of people at locations illustrated by the map. Concepts may be accurately determined by using natural language understanding techniques.

BACKGROUND

Maps that are two-dimensional pictures of a particular geographical location take many forms. Maps exist that indicate the activities or demographics of people over mapped space. The information that is used to represent an aggregation of activities and demographics of people have largely come from public records and research studies such as crime statistics, traffic patterns, residential social-economic studies, census data, market surveys, tax assessment data. It is relatively new for such maps to mine data from the Internet contributed by individual users. Furthermore, information previously available was not a reliable predictor of future behavior by people in an area.

Data mining and machine learning by computers have been applied to everything from setting credit scores to making investments to predicting crimes. Some systems use natural language processing according to widely used human languages, such as English, Mandarin Chinese, Japanese, and German, to extract meaning and intent from raw data. Associating meanings with individual people, based on their expressions, may be an accurate predictor of their interests, future behavior, and even travel patterns. Mobile devices, and localized terminals, allow systems to process natural language meaning and intent for individuals across whatever locations they transit. However, such systems do not process natural language meanings and intents for particular locations and for the various individuals that pass through the locations.

Some experimental systems have used associations between geolocation tags and key words in Twitter tweets or other social media messages to make fascinating maps of sounds, smells, and emotions throughout cities. Such systems analyze data simplistically and provide data that is only useful for simple applications. Such systems use specific sets of keywords identified by researchers. However, mining social media message for keywords may not provide an accurate indication of the user's thoughts. Consider for example a user tweeting "the ball's in your court" may identify sports-related concepts rather than negotiation. The value of the thought map depends on the accuracy of identifying concepts.

Furthermore, keyword-based systems do not provide useful analysis across the dimension of time. In particular, they do not recognize cyclical patterns in time, such as expressions at particular times of day or days of week, and they do not recognize cyclical patterns in location, such as from bus stop to bus stop or house to house.

SUMMARY OF THE INVENTION

The present disclosure relates to mapping concepts mined from utterances of natural language expressions to locations. Locations may be aggregated into regions, and a concept-location relationship may further be associated with a time indication. That is, concepts associated with a location may change over time such as throughout the day or week or month.

The method and systems described herein provide creating an accurate thought map by recording for analysis people's many utterances of natural language expressions (hereafter "natural language expressions" or "expressions"), each expression recorded together with the location at which each expression was made. Natural Language Understanding (NLU) techniques are used to interpret a person's text or spoken words, creating an interpretation data structure to represent the automatically determined semantics of an expression. A person's context and/or relationships among words in a sequence of words may be used to enhance understanding of the expression. Entire interpretation data structures of a natural language expression may be stored in a database together with the associated location data. Statistical techniques or other data aggregation methods may be used to analyze these database records to determine concepts frequently associated with a place of interest. Once one or more concepts are associated with a location (and possibly a time), the data may be used to discover which concepts are associated with a particular place. A person considering buying a house at a particular address may get an idea of the neighborhood dynamics by looking at the prevalent concepts in the area. Alternatively, to discover which places are associated with a particular concept, which might be useful for determining where to place certain advertisements.

Terminology

Thoughts: non-technical term referring to what's on people's minds when they speak or write natural language. Thoughts are represented using computer data structures that represent the semantic interpretations of natural language expressions.

Region: a geographic range that can be displayed on a map. Regions may be defined in many ways. For example, one or more of latitude-longitude ranges, zip codes, geopolitical definitions or custom boundaries, such the locations within view, or within hearing distance, of a specific point of interest.

Location: a smallest distinguishable area within a region, such as a cell within map grid, a building, or an area within hearing range of a microphone.

Geolocation: a specific point within a region, such as a specific latitude-longitude pair, specific zip code, or specific point of interest. Geolocation data is fresh if it has been updated more recently than the amount of time it could take to change location. The geolocation for a stationary device is always fresh. The geolocation for a slow moving device, such as a hiker's mobile phone in a large mountain range is fresh for long periods of time. The geolocation for a fast moving device, such an airplane over a city, is fresh only for short periods of time.

Interpretation: an interpretation is a complex data structure created by a semantic parser and used by a data processing system to represent meaning of natural language expressions.

Component: A component is a part of an interpretation that represents a unit of meaning. In semantic graph, a component is a subgraph that comprises a subset of nodes and edges in the interpretation; this subgraph represents entities and relationships between entities that together define the component. The smallest components involve a single node (an entity), or two nodes joined by an edge. For example, a component may represent the relationship between a person entity who is the parent and a person entity who is the child.

Constituent: Constituents are words or group of words that function as single units within hierarchical structures (such as clauses and phrases). Natural language grammars, including primarily phrase structure grammars (e.g., context-free grammars) and dependency grammars, break down expressions into constituent parts. The structures created by these two types of grammars are different, although closely related.

All constituents are explicit parts of the original expression; the corresponding components are semantic counterparts of those constituents.

Domain of discourse (knowledge domain): subject area that is associated with a class hierarchy of graph. For example, a food domain may include a fast food class that may include a hamburger class and a french fries class.

Concept: an abstract idea, a general notion associated with an entity or class. Fast food, hamburgers and french fries may be concepts in a food knowledge domain.

Expression: People can use natural speech to create spoken expressions, and write, type, or gesture natural language expressions. Microphones, keyboards, touch screens, cameras, and other means are appropriate for capturing expressions. Expressions can be created in text form. Expressions can be converted to text form by automatic speech recognition (ASR) systems.

Salience: the difference between a localized density and a general density of a concept being expressed.

Person: a source of natural language expressions.

User: somebody who operates a machine, system, or service such as a mobile phone, the internet, or a virtual assistant.

Consumer: the target of advertising. Some embodiments process expressions from some people to determine advertisements to present to consumers. In some cases the people who make the natural language expressions are the consumers.

Ontology: An ontology represents at least a collection of object classes and relationships. between instances of the classes. In some embodiments, ontology includes a hierarchy of classes. In some embodiments, a relationship is constrained by a type system that specifies the classes of the instances that can enter the relationship. Some embodiments associate classes with behaviors called 'scripts' that describe sequences of actions that an instance of the class can perform.

The present disclosure relates to various aspects of data structures, data collection, and data analysis. These are applicable to various industries and for various purposes, such as providing people with useful information just when they need it. Not all aspects are present in all embodiments of the invention described and claimed.

An aspect of the invention is capturing and processing natural language expressions. An aspect is collecting data using audio capture, such as through microphones. An aspect is capturing audio using mobile devices. An aspect is capturing audio using geostationary devices. An aspect is capturing audio pervasively, in places where people are and travel.

An aspect is associating natural language expressions with particular locations. An aspect is associating natural language expressions with particular time ranges. An aspect is associating natural language expressions with particular people. An aspect is associating natural language expressions with particular demographic information. An aspect is associating natural language expressions with particular devices. An aspect is associating natural language expressions with measures of accuracy of geolocation. An aspect is associating natural language expressions with measures of the age of geolocation detection. An aspect is associating natural language expressions with measures of speed and direction of movement.

An aspect is using a computer for the natural language understanding of expressions to determine interpretations. An aspect is processing natural language expressions to determine emotions of speakers. An aspect is matching parts of interpretations. An aspect is ignoring particular entities and attributes within interpretations.

An aspect is storing geolocation information in a representation that is conducive to rendering maps at different scales. An aspect is filtering thoughts based on values or ranges of location, timestamp, cyclical phase, person, device, and other parameters associated with natural language expressions. An aspect is determining locations of thought sources. An aspect is determining location by using averaging of multiple measurements. An aspect is weighting averaged locations by accuracy of location measurement. An aspect is correcting location measurements by adding direction vector times speed times measurement age. Another aspect is performing fuzzy matching of location.

An aspect is predictively providing useful information. An aspect is providing location-specific advertising. An aspect is providing person-specific advertising. An aspect is providing time-specific advertising. An aspect is providing information that promotes public safety. An aspect is predicting future behavior of people. An aspect is looking up particular thoughts or categories of thoughts according to geolocation, time of day, day of week, or other criteria.

BRIEF DESCRIPTION OF THE DRAWINGS

FIG. 16 is a block diagram of a computer system, according to an embodiment.

DETAILED DESCRIPTION

The present invention relates to creating thought maps for a geographic region, optionally over time. The value of the thought maps depends on the accuracy of mining concepts from natural language expressions of people in the locations being mapped.

Figure 1:
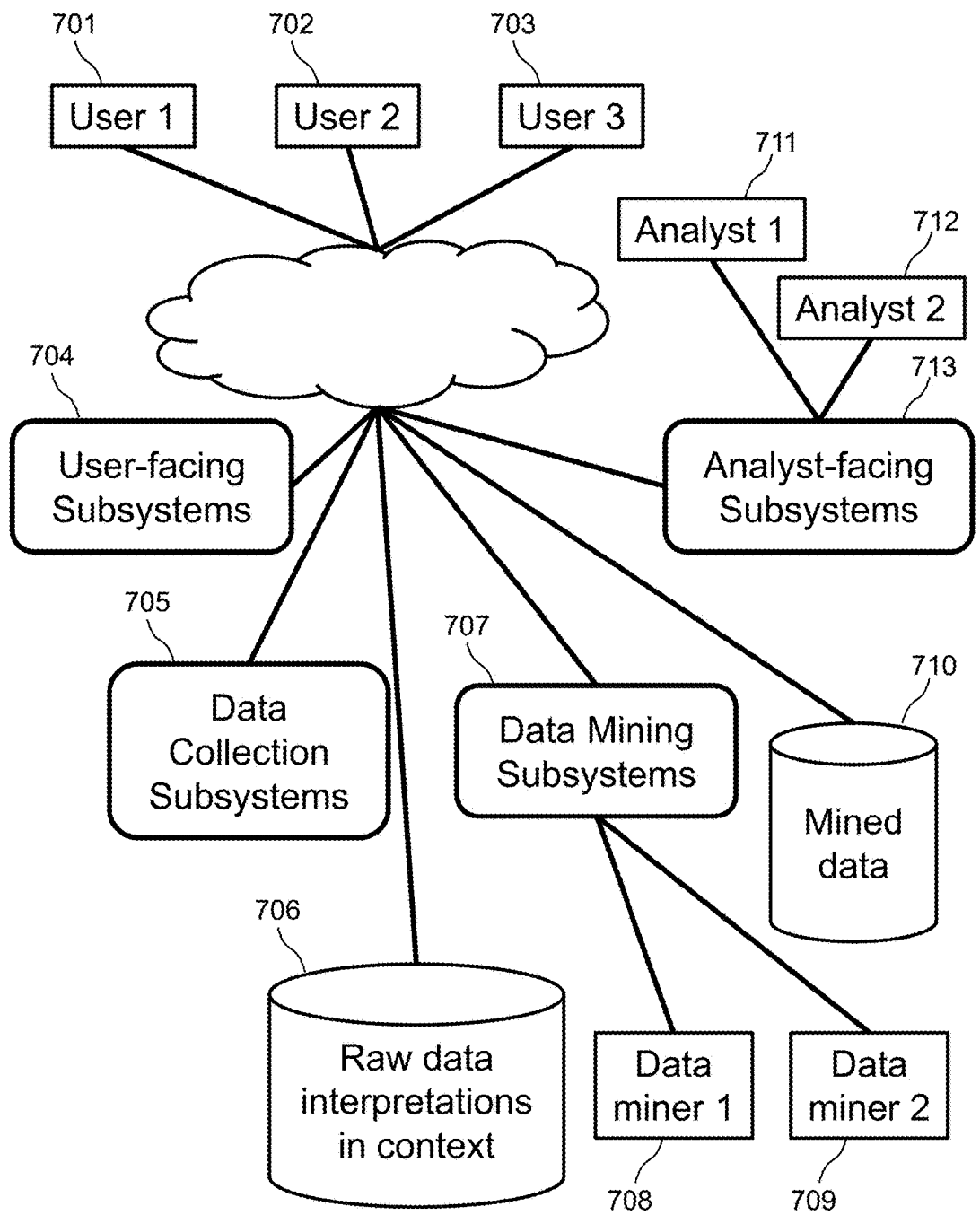
FIG. 1 illustrates a system in which a network connects people, data miners, and analysts to servers according to an embodiment of the invention.

FIG. 1 illustrates a system in which a network connects people, data miners, and analysts to servers, according to an embodiment of the invention. Natural language expressions are collected from mobile device users 701 and 702, and users of devices with known fixed locations 703. Known locations are often apparent from an IP address, software registration, cell tower proximity, or other known methods. A user-facing server subsystem 704 receives the user expressions from over a network, and passes the expressions to servers in a data collection subsystem 705. In some embodiments, the user-facing subsystem 704 parses and interprets expressions to produce interpretations, and in some embodiments the data collection subsystem 705 parses and interprets expressions to produce interpretations. The data collection subsystem 705 add records to a database 706 comprising raw data from expressions, their context, and their interpretations. Servers within a data mining subsystem 707, as directed by data miners 708 and 709, process the raw data to create a database of mined data 710. Analysts 711 and 712 access the mined data using servers within an analyst-facing subsystem 713. Various embodiments have any number of users, data miners, and analysts.

The data mining subsystems may proactively transform the raw data in database 706 into a format more easily used for analysis purposes and stored in mined data 710. Alternatively, the analyst-facing subsystems may start with the raw data in database 706 instead of using pre-mined data.

In one embodiment, an organization providing the data collection subsystem 705 may be distinct from the organization providing the data mining subsystem 707. Yet a third distinct organization may provide the analyst-facing subsystem 713. In other embodiments, a single organization may provide two or all of these subsystems. Similarly, some people may perform both data miner and analyst roles, and some people may perform one role and not the other. Many variations of the embodiment of FIG. 1 will be apparent to ordinarily skilled practitioners.

Figure 2:
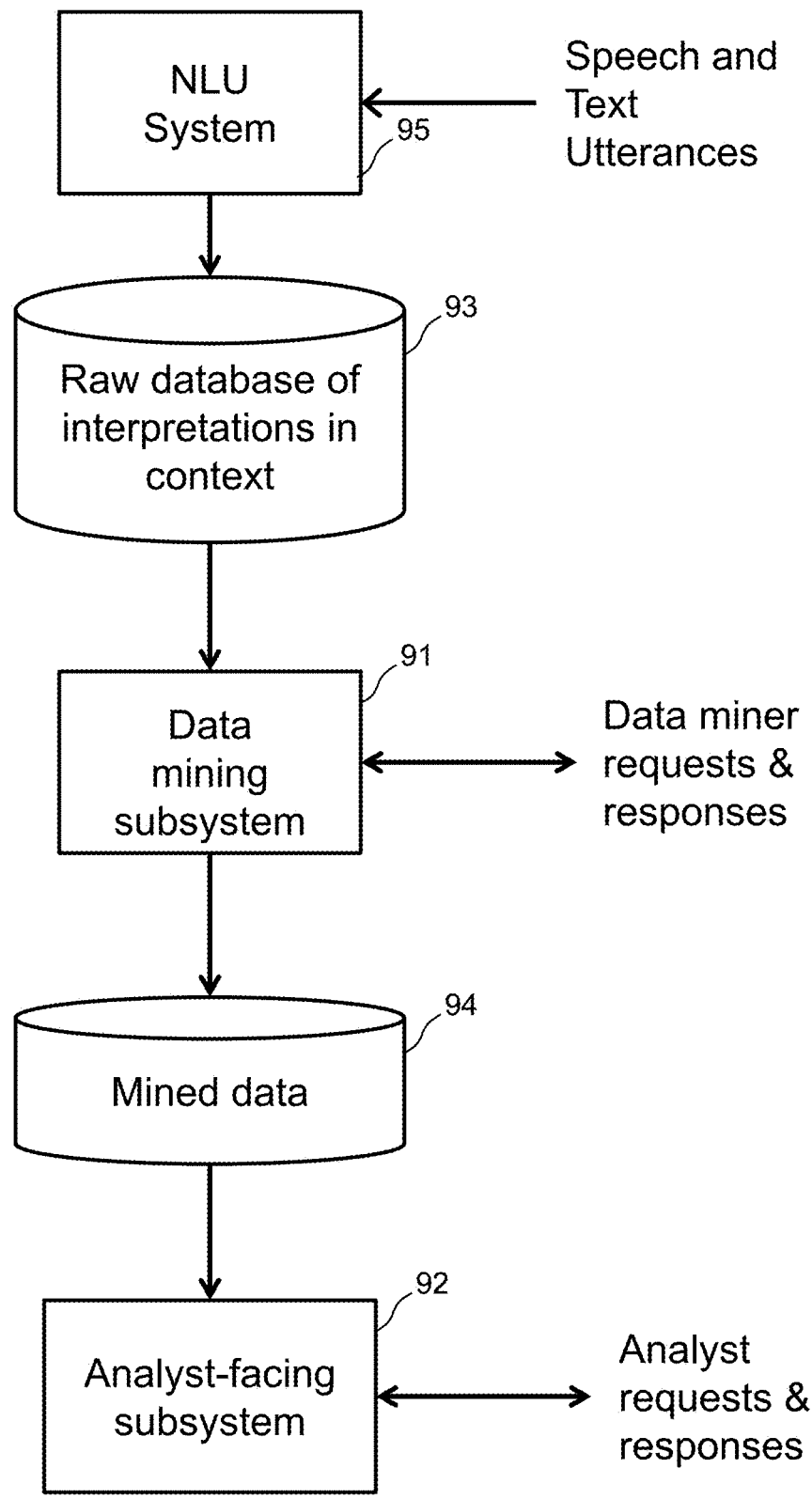
FIG. 2 is a flow diagram that illustrates the process of capturing and analyzing data to create a thought map according to an embodiment.

FIG. 2 is a flow diagram that illustrates the process of creating a thought map according to an embodiment of the invention. People located in a region of interest speak in the presence of a microphone or type a natural language phrase on a device such as a phone. These natural language expressions may be processed by a local computing device, for example, a device that captured the speech or text. Alternatively, the expressions may be sent to a data center outside of the region for processing. The NLU system 95 receives the expressions along with an indicator of the location in which the expression was captured and creates an interpretation, which is a semantic representation for each expression. The NLU system 95 stores the interpretation data structure in a database, such as Raw database of interpretations in content 93, together with the associated location.

A data mining subsystem 91 analyzes the data in raw database 93 to determine for each distinct location represented, concepts in each expression, and aggregates the concepts across users. Data mining subsystem 91 searches the interpretation data structures for concepts of interest. The concepts of interest are stored in one or more knowledge domain concept graphs.

Data mining can be run proactively at a configured interval, or can be triggered on demand by a data-mining request that may specify one or more knowledge domains. An example aggregation is to count the number of occurrences of a concept across all interpretations associated with a particular location, or to count the number of interpretations that include at least one instance of the concept.

The output from the data mining process is stored in the database of Mined data 94. This data provides sufficient information to draw a thought map of the region of interest. However, an analyst-facing subsystem 92 may retrieve data in response to a query created to answer an analyst request. For example, an analyst might request a histogram of the frequencies of the top 100 most frequently expressed concepts. In another example, an analyst might request a list of the 10 most common concepts expressed by people in the age range of 21 to 35 years old. In another example, an analyst might request the salience of a specific concept within a location.

The present invention, in various embodiments, relates to the processing of natural language expressions to serve the needs of multiple constituencies, such as users of mobile devices, data miners, analysts and advertisers.

Figure 3:
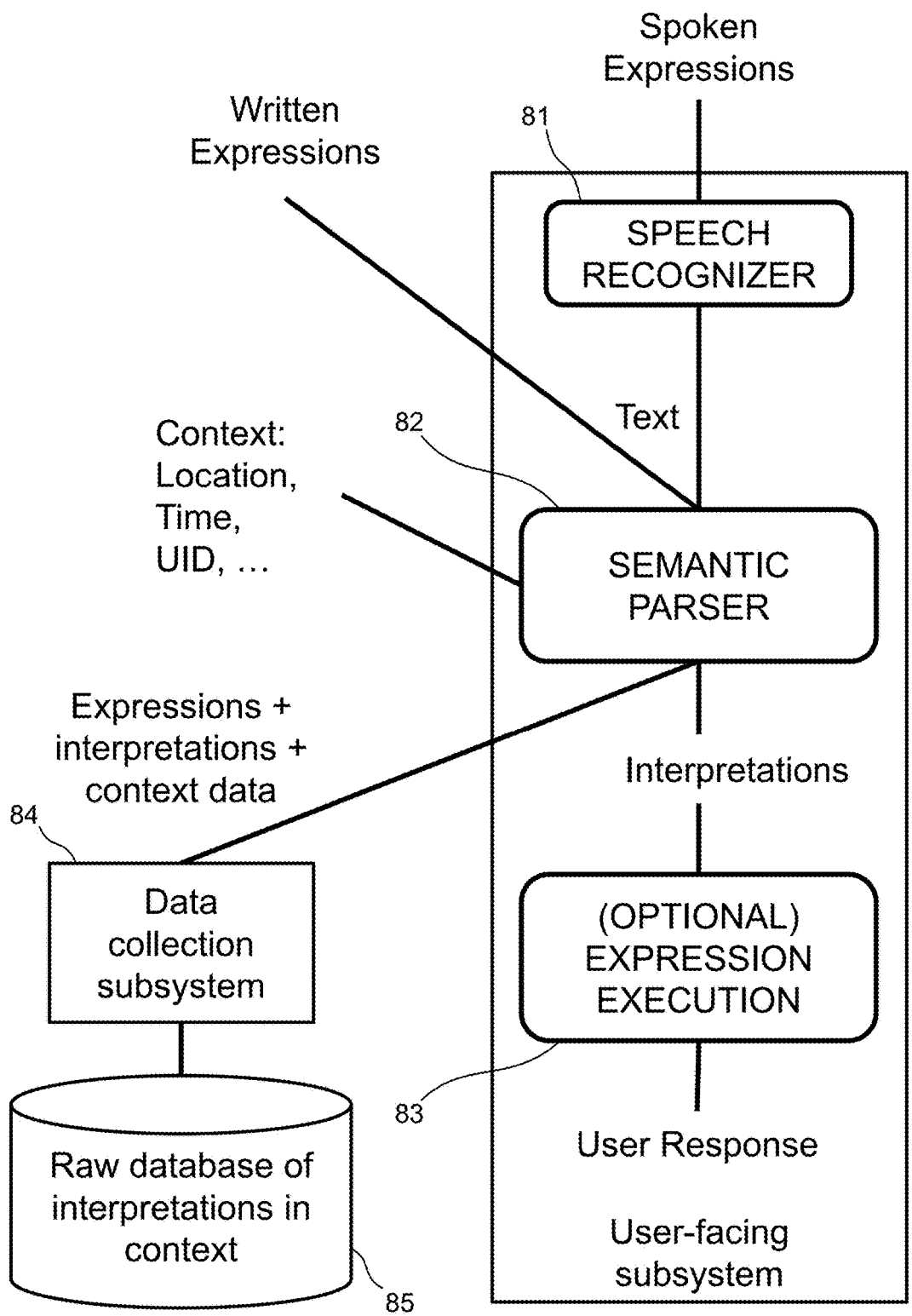
FIG. 3 illustrates an embodiment of a person-facing subsystem, and communication with a data collection subsystem according to an embodiment.

FIG. 3 illustrates an embodiment of a mobile-device-user-facing subsystem and its communication with a data collection subsystem. Natural language expressions may be spoken and captured using a microphone in a mobile device such as a cell phone, or from stationary microphones installed in locations of interest. Any means of capturing speech audio signals can be used. The acoustic signals may be transmitted over a network the user-facing subsystem 704. Alternatively, when the microphone capturing the speech is connected a processor, the processor may transcribe the captured speech locally on the device, and the resulting textual transcription may be sent over the network to the user-facing subsystem 704. Natural language expressions may be typed as text, requiring no speech to text transcription.

Within user-facing subsystem 704, a speech recognizer 81 converts speech to text. A semantic parser 82 analyzes text from people's expressions to create corresponding interpretations. The text may come from the output of the speech recognizer 81, from a speech transcriber co-located with the speaker (such as a mobile device), or from the person expressing thoughts directly in text. The semantic parser uses contextual information, including one or more of geolocation, time, and user identity, among other information, to improve its parsing ability. More detailed explanation is provided about contextual information below.

In some embodiments, and for some expressions, an expression execution module 83 uses the interpretation to construct a response for the user.

In response to receiving an expression, the user-facing subsystem assembles information packages that include one or more of the expression audio, expression text, an interpretation of each expression, concepts from the interpretations, and expression context information. The subsystem sends the information package to a data collection system 84. Various embodiments include different content in information packages. In some embodiments, information packages have a rich structure. Some embodiments serialize information packages when transmitting them between subsystems. In some embodiments, serialized information packages are represented using special purpose formats. Some such formats use custom implementations. Some use schemas such as JSON. In some embodiments, serialization and de-serialization are not necessary because the user-facing systems and data collection systems are hosted by the same servers and can share internal data structures.

The data collection system 84 receives the information packets, and stores their contents in a database 85. Many alternative formats are possible for storing records in the raw database. Some of the data to be stored, such as time, location or user ID, has a fixed size. Other pieces of information, such as expression audio, expression text or some of the constituents, can be stored as variable strings. ("[[Ed] wants [to impress [[the] girl [with [[a] [pearl] necklace]]]]]") is a simple string format for representing a dependency tree. In some embodiments, such strings can be annotated to associate tree nodes with semantic data, such as constituents, or references to constituents through unique identifiers. In some embodiments, interpretations are stored using sets of triples. Some embodiments index the database proactively when adding records to the raw database. Other embodiments create indexes at a later time.

Contextual Information

A variety of contextual information may be captured in association with a natural language expression including location, personalization, and time. The contextual information may be used to increase the accuracy of constructing an interpretation or mining concepts from an interpretation. Interpretation records may also be stored as indexed by contextual information to enable fast retrieval of interpretation records relevant to creating a particular kind of thought map.

Many notations exist to represent geolocation including latitude+longitude, Geohash, what3words, street addresses, and zip codes. Some embodiments store geolocation data along with interpretations in database records. Some embodiments index the database by geolocation. The Geohash encoding of locations is of particular interest due to the combination of its ease of searching and its scalability. A Geohash represents a two-dimensional rectangular range of latitude-longitude values as a string of lower case characters; the length of the code determines the resolution of the cell. Geohash coding subdivides space into a hierarchical grid of cells. Each additional character in a Geohash code divides the current cell into 32 sub-cells, alternately 4×8 or 8×4 sub-cells, so that at each stage, "portrait" cells alternate with "landscape" cells. Conversely, removing characters from the end of a Geohash code loses precision gradually. Another encoding known as quad trees has similar hierarchical properties, but the encoding uses binary strings.

Many systems can contribute to the determination of geolocation; these include satellite constellation systems such as Global Positioning System (GPS), Galileo, Glonass, and BeiDou, Long Range Navigation (LORAN), cell tower proximity and triangulation, and Bluetooth Low Energy. Some systems can also determine a degree of accuracy for each location measurement. Some systems only measure location from time to time, and report a measurement age when the location value is retrieved. Some systems also measure speed of motion. Together, speed and age are useful to estimate geolocation at a time different from the moment of measurement.

Some embodiments store one or more of geolocation, location measurement accuracy, measurement age, and speed with each record in a database. Some embodiments measure or provide geolocation information with a precision that is less than the measurement accuracy. This is useful for obscuring positions of measurements taken. Some such embodiments round or truncate coordinates, which causes banding in representations. Some embodiments add random values within a small range to measurements in order to reduce accuracy.

A user device that captures a user's expressions may also provide personalization data that identifies the person who articulated the expression. This is only possible if systems can identify people uniquely, such as personal mobile devices or systems that require user authentication such as ATMs. If the system captures expressions in a public place, such as a shopping kiosk or vending vehicle, or on a device shared by many people such as an office equipment system, unique user IDs are unavailable.

Some embodiments, whether or not they identify the speaker who produces an expression, identify listeners. Some such embodiments store, with records in the database, a list of person IDs of listeners known to be present, if any. Some embodiments that identify listeners maintain a separate "listener" database, and include date-ordered lists of records that were likely heard by the person. This is useful to assist human perception and memory by capturing expressions, ensuring that the listener did not mis-hear them, and recording them in personal knowledge bases for future search and recall. Some such systems interface to personal cognitive enhancement devices.

Some embodiments store, with each record in the database, demographic information about the speaker. Demographic information includes information such as gender, age, marital status, race, political orientation, education level, and economic status. Some such embodiments index the interpretation database by one or more types of demographic information. This enables better prediction of people's interests, needs, and likely activities, which enables various devices to provide better services. It also enables targeting of advertisements and law enforcement.

In an embodiment, each expression record in the database may be stored with a timestamp identifying the time at which the expression was uttered. In such an embodiment, the database records may be indexed by timestamp. This is useful for efficiently filtering records by time range.

Some embodiments store, with each record in the database, time period phase information. This is useful for filtering records based on time ranges within event cycles, such as ranges of hours within days, days within weeks, days within years, or months within years. Some embodiments calculate phases from timestamps after reading the database. Some embodiments record phases in the database.

Creating Interpretations

This section describes the NLU System 95 that receives natural language expressions and creates interpretations to store in raw database 93.

People communicate thoughts using natural language expressions, using speech or text. Computer systems can represent human thoughts using data structures that provide computable representations of meaning. Such semantic representation data structures are called interpretations of the expressions. Interpretations may be stored in various as data structure formats. Common interpretation formats include frames (as described by Marvin Minsky's 1974 article "A Framework for Representing Knowledge"), semantic memory triples <Entity, Attribute, Value> (EAV triples), and first-order logic. The various formats used for representing meaning are broadly equivalent and largely mutually convertible, although they can have different advantages and different expressive power. In this disclosure, example interpretations are represented using triples in a semantic memory. Other semantic representations are appropriate for practicing the invention.

A triple consists of an entity, a named attribute, and one or more values of the attribute. An entity is an instance of a class in the ontology of a domain, representing an object of discourse—for example, an animate object, an inanimate object, or an abstract object. Entities such as people, things, places, and times, appear in natural language expressions, and may be specified by nouns, such as "Ulaanbaatar", or by phrases, such as "the capital of Mongolia".

Defining a class hierarchy is an essential part of an ontology. For example, in a virtual assistant's Calendar domain, a Woman is a Person, and a Person has attributes such as Name, PhoneNumber, Address, Gender, and so on. Whereas in a general Biology domain, a Person is a Human, a Human is a Primate, a Primate is a Mammal, and so on. This is a simplistic taxonomy. A Mammal has a Gender attribute, for example, and all the subclasses of Mammal have a Gender attribute that is inherited from the Mammal class. In some embodiments, an ontology specifies at least a class hierarchy, a set of attributes applicable to each class, and constraints (such as types) on the values of attributes.

The interpretation of a given expression often comprises several entities, and each entity may have multiple known attributes. For example, an act of eating may involve the person who does the eating and a description of the food that is eaten. The person is an entity that has a name, which in various embodiments may be represented by one or more of a string, a complex data structure, and a user identifier (UID). A geolocation and time of day may also be associated with the interpretation of the expression as a whole.

An entity of type Thing (i.e., a physical object) can have numerous attributes; only some of them are applicable to each subclass of Thing. Possible attributes of a Thing include a size, a material, and a list of parts. The parts are instances of other Thing entities. In some embodiments, the interpretation data structure simply omits attributes whose values are unknown. Place entities can have attributes such as an address, latitude, longitude, and a name. Time entities can have year, month, day, hour, minute, second, and a time zone.

Each instance of an entity has one or more attributes, each of which has a value that, at any given time, may be assigned or not. Most values have types; some types have range restrictions. For example, an age value may be a number of years, from 0 to 122. A gender value is a selection from among a list of discrete choices, and a name value is one or several words.

For another example, consider that a Person entity might have a "shirt" attribute that references a Shirt entity, which (as any subclass of Clothing) supports a "place of manufacturing" attribute, whose value is a Country entity, and a Country has a "name" attribute. Thus, after the Person referred to by "her" has been identified, a system can answer the question, "Where was her shirt made?"

Regardless of the particular knowledge representation in an embodiment, interpretations provide a way to expose the structure of expressions. Some embodiments structure interpretations as parse trees, syntax trees, or dependency trees. Some embodiments augment nodes and edges with semantic information. Some embodiments represent the semantic structure using property lists.

In some embodiments, the interpretation of a natural language expression is created by a semantic parser. In some embodiments, the semantic parser extracts the expression's syntactic structure, such as a dependency tree, according to a grammar, such as a dependency grammar. Given the expression, the grammar creates a hierarchy of constituents, and the semantic parser associates with each constituent a corresponding semantic component. A constituent is a part of the natural language expression, and a component is a part of the semantic interpretation of the expression. In some embodiments, the semantic parser depends on partial parsing techniques. Some such embodiments use part-of-speech (POS) tagging to identify some, but not all, of the constituents and associated semantics. Some embodiments do partial parsing. Some embodiments do full parsing.

Figure 4:
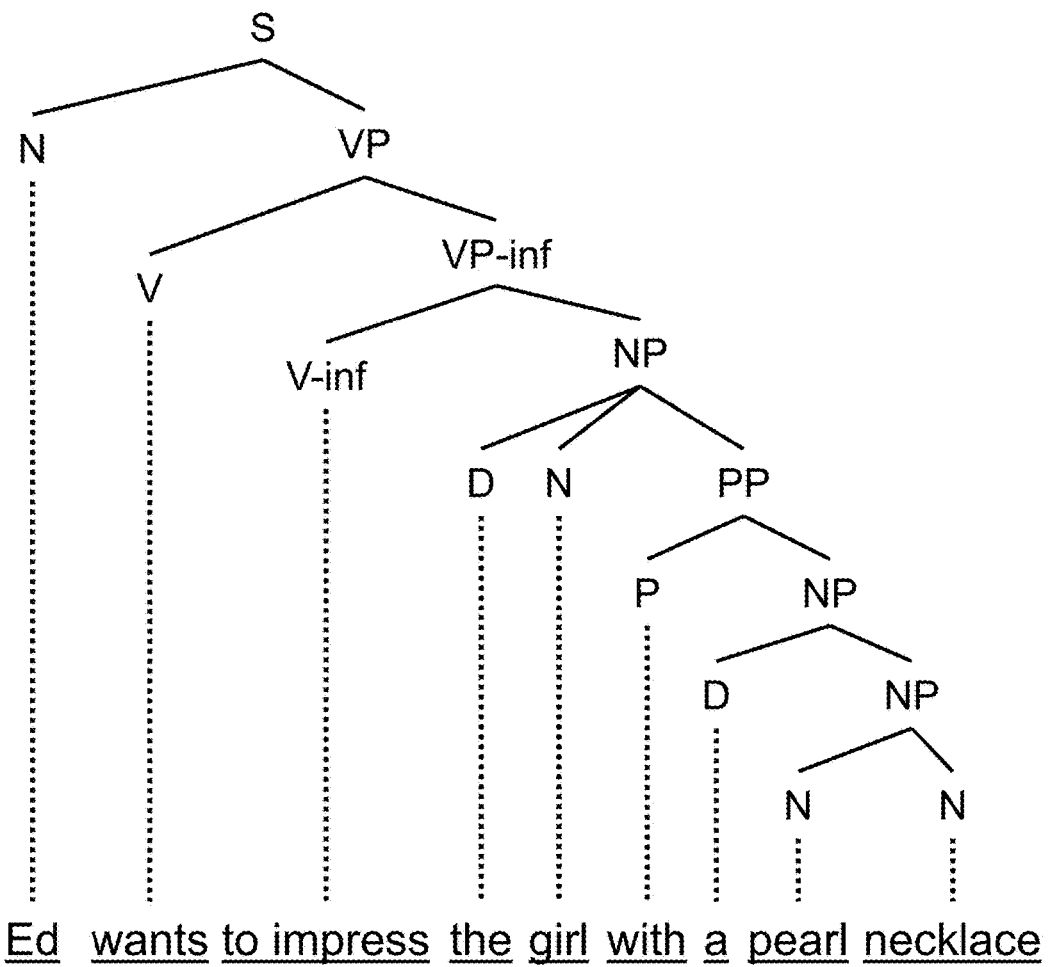
FIG. 4 illustrates a parse tree for an expression according to an embodiment.
Figure 5:
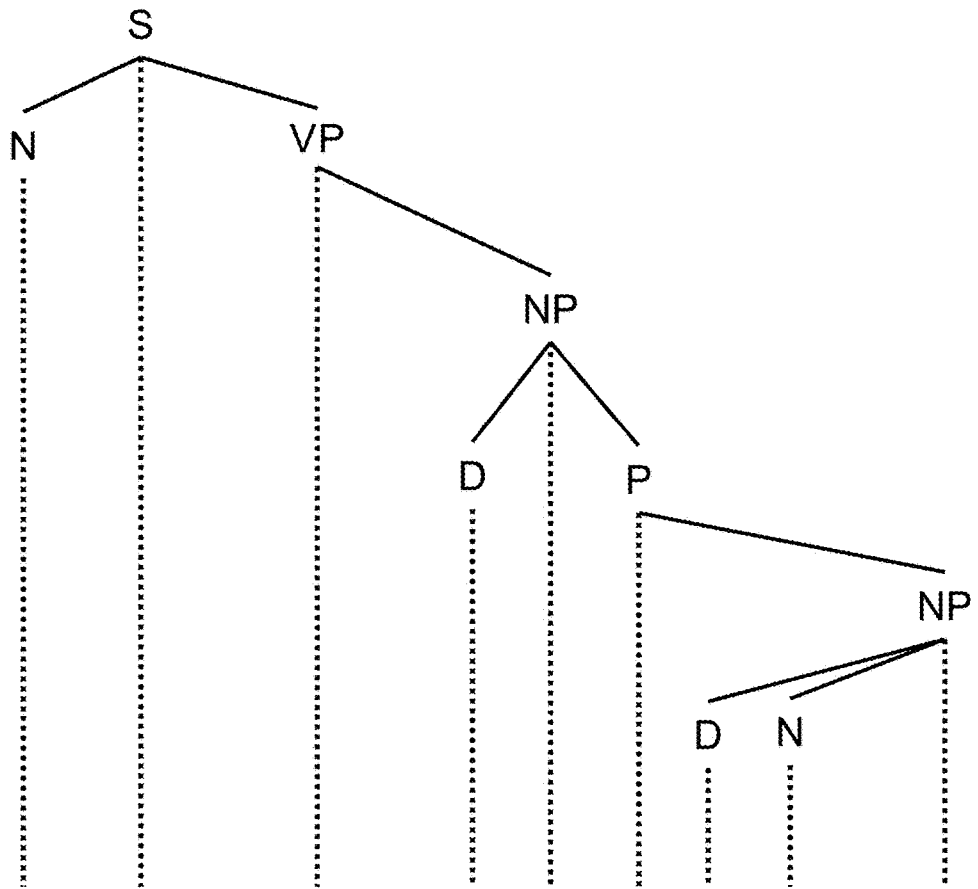
FIG. 5 illustrates a dependency tree for the same expression according to an embodiment.

FIG. 4 illustrates a possible parse tree for an expression "Ed wants to impress the girl with a pearl necklace" according to a phrase structure grammar. FIG. 5 illustrates a possible dependency tree according to a dependency grammar for the same expression. A "constituent" is either the entire expression, or an expression generated by any labeled subtree that consists of a node plus all the nodes dominated by that node. Comparing FIG. 4 and FIG. 5 shows that most, but not all, constituents are the same in the two tree structures. For example, "the girl with a pearl necklace" is a constituent in both trees, but "girl" is a constituent in the phrase structure grammar only. The essential constituents from the point of view of building a semantic interpretation are the dependency constituents. In the present disclosure, the hierarchy of dependency grammar constituents is conveyed textually using brackets that mimic the dependency tree:

[[Ed] wants [to impress [[the] girl [with [[a] [pearl] necklace]]]]].

The corresponding dependency grammar constituents are enumerated below:

"Ed"
"the"
"a"
"pearl"
"a pearl necklace"
"with a pearl necklace"
"the girl with a pearl necklace"
"to impress the girl with a pearl necklace"
"Ed wants to impress the girl with a pearl necklace"

The role of constituents and their associated components can be illustrated by comparing interpretations of an ambiguous expression. An ambiguity is present in the example "Ed wants to impress the girl with a pearl necklace." The pearl necklace might be something distinctive that the girl wears that identifies which girl Ed wants to impress. Alternatively, Ed might want to impress the girl by giving her a pearl necklace. The ambiguity leads to two ways of breaking the sentence into constituents. The contrast between the two constituent structures is shown below, by displaying the groupings where the difference occurs:

(1) Ed wants [to impress [the girl] [with a pearl necklace]]
(2) Ed wants [to impress [the girl with a pearl necklace]]

Structure (2) is the one that had been illustrated in FIG. 4 and FIG. 5. The two different structures convey different meanings. For example, using structure (1), the question "How does Ed want to impress the girl?" can be answered "with a pearl necklace" whereas using structure (2), the same question could be answered "I don't know". The question "Who did Ed want to impress?" is simply answered "the girl" using structure (1), and "the girl with a pearl necklace" using structure (2); in a given context, these might be different girls, or perhaps "girl with a pearl necklace" could be interpreted as referring to a specific girl, whereas "the girl" could remain ambiguous. Using structure (1), the question "Is Ed interested in buying a pearl necklace?" is answered "Yes" (meaning: this is likely under the circumstances) whereas using structure (2), the same question is answered "No" (meaning: there is no reason to think so), and the difference between the answers is relevant to an advertiser of pearl necklaces.

Figure 6:
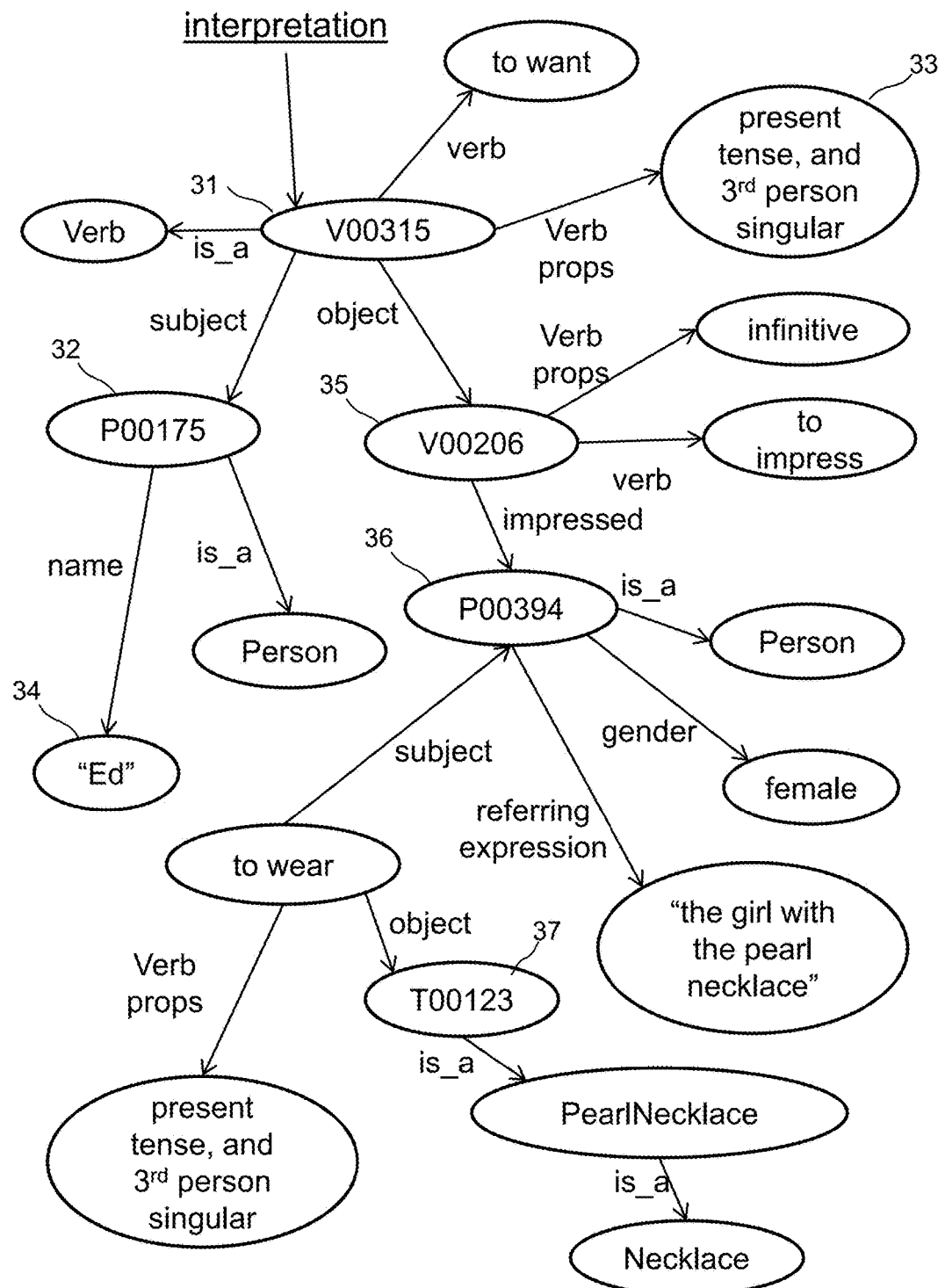
FIG. 6 illustrates an interpretation data structure for the same expression according to an embodiment.

FIG. 6 illustrates a possible interpretation structure, in an embodiment, corresponding to FIG. 4 and FIG. 5, and to structure (2) above. Unique entity IDs such as V00315 (#31), and P00175 (#32), are created by the system as needed to represent objects of discourse. They appear as nodes in the representation. In this semantic data structure, entity V00315 [Reference number (#) 31], is an instance of the Verb class. As such, it has an associated verb, and verb properties. The verb is "to want" and the properties (#33), are: present tense, third person, singular.

The verb "to want" associated with Verb instance V00315 (#31), has a subject (the one who wants) which is associated with the constituent "Ed" (#34) and has been paraphrased in the graph as "a Person called Ed." Verb instance V00315 (#31), also has an object, which specifies what is wanted, specifically for this instance. The wanted entity, in this case, is Verb instance V00206 (#35), which is the verb "to impress" in the infinitive form. The verb "to impress" inherits its subject from the governing auxiliary verb "to want" and has an object, the Person to be impressed, which is represented by the substructure whose entity unique ID is P00394 (#36). This entity does not have a name, but it stands for the constituent "a girl with a pearl necklace" and it is paraphrased in the graph as "a female Person who wears thing T00123 (#37)." The graph specifies that T00123 (#37) is an instance of the class PearlNecklace, and it is further known to the system (by way of a domain ontology) that PearlNecklace is a subclass of the PearlNecklace class. The semantic network shown in FIG. 6 illustrates the key relationships that are relevant to applications involving this example. Other embodiments represent relationships in different ways.

In some embodiments, co-reference resolution techniques are used in an attempt to equate P00175 (#32) ("Ed") or P00394 (#36) ("the girl with the pearl necklace") with previously known entities. Co-reference resolution is performed based on available context. Context can include previous expressions, knowledge about the environment, or other relevant facts. Any co-reference resolution technique is appropriate.

All constituents are explicit parts of the original expression; the corresponding components are semantic counterparts of those constituents. In some embodiments, components are complex substructures, such as subgraphs, with a head node; for example, the head node for "to impress the girl with the pearl necklace" is P00394 (#36).

A concept is an abstract idea, a general notion associated with an entity or class (such as a fruit), an action (picking a fruit) or an entire scenario or "script" (a formal wedding). A concept belongs in a knowledge domain. Some concepts are expressed directly by words or phrases in an expression. For example, a mention of "apple" expresses the concepts "Apple". But it also invokes the concept Fruit, which is a superclass of "Apple" in a domain ontology. The use of domain ontology includes ascending ontology classes from more specific to more generic classes. Note that ontology is not a strict hierarchy. The Person class is a subclass of Human, itself a subclass of Mammal, Animal, and so on, but it is also a subclass of Contact, a class that also has Business as a subclass. More advanced uses of ontology depend on associating a script with the meaning of an expression. For example, the expression "The masked man broke into Wells-Fargo through the roof" calls for the underlying script Robbing_A_Bank_, which is a subscript of the Robbery_ontology script. The verbalization of a concept uses concept words, in this case, "robbery" and "bank" or "bank robbery"; these words are only partial reflections of the concept such as the Robbing_A_Bank_script.

To simplify communication, it is common to refer to the concept words (a concept's verbalization) as if they were the concept itself; the concept, internally, can be a complex data structure that presents a challenge to communicate and display.

Another example, in another domain of discourse, is the concept "measuring the blood pressure of a patient." Other concepts include "measuring blood pressure" and "pressure measurement" however "measuring blood" is not a concept; this is because it is not blood that is measured, only its pressure. Measuring blood is not semantically self-contained, generic and broadly useful. The essential properties of a concept are that it can form a part of a semantic interpretation, and that it can be verbalized.

Specific representations of interpretations given above are merely illustrative of a full syntactic and semantic treatment of natural language expressions.

Representations of parse trees (FIG. 4), dependency tress (FIG. 5) and interpretation graphs (FIG. 6) typically use internal pointers for efficiency, but they can be serialized in order to be transmitted to a separate part of a larger system, and de-serialized by the receiving system module. Languages often used for serialization/deserialization include JSON and XML.

Emotional Charge and Emotions

Some embodiments analyze natural language expressions for emotional charge, which they store either within or in association with the interpretation. There are various methods of sentiment analysis. Some embodiments assign an emotional charge to a concept in the form of a single number. Such a representation of emotional charge can assume a range of values from highly negative to highly positive. For example, "killing" and related concepts have a highly negative charge, whereas "love" has a highly positive charge. Emotional charge can also be scaled according to factors that depend on values of attributes. For example, if the value of the score attribute of a school exam is 'so-so, the concept is a little bit negative. If the score is 'good', the concept is a little bit positive. If the score is 'excellent', the concept is very positive. Some embodiments compute the emotional charge of expressions. Some embodiments scale the emotional charge using contextual information about people and their environments. For example, "money" has different emotional charges to different people, and "deepness" has a different emotional charge in swimming than in shoveling snow. Some embodiments train the association of emotional charge with concepts or scaling functions by means of crowdsourcing and machine learning. After training, the value of emotional charge can be derived, at least in part, from the trained associations.

Some sentiment analysis functions represent simply a scale of 1 star to 5 stars. Some sentiment analysis functions represent emotions as polarity and magnitude values. Various systems exist for representing emotion values. Some quantify values of emotions such as anger, disgust, fear, happiness, sadness, and surprise; others are dimensional, using two, three, or more dimensions. Various embodiments process interpretations or associated concept sets to determine emotion values. Some embodiments use attributes of captured speech, such as prosody, including speech rate and rhythm, stress, emphasis and pitch contour, to compute or scale emotion values. Some embodiments store emotion values along with interpretation in database records.

Advantages of Concepts Over Keywords

Extracting keywords from expressions is trivial. Keyword descriptions are not sensitive to word order. For example, the expressions "Ask what your country can do for you" and "Ask what you can do for your country" have the same keywords, though they have different meanings. Similarly, "a little too big" has both keywords 'little' and 'big', but the meaning relates to being big, not little. In Chinese, "上海的白来水" and "水来自的海上" have the same set of characters, though they have different meanings. In French, "l'amour fait passer le temps" and "le temps fait passer l'amour" have the same keywords, though they have different meanings. For many expressions, parsing the natural language is required to determine the intended meaning.

In contrast with simply extracting keywords, a semantic parser that converts natural language expressions to semantic interpretations is complex, but represents thoughts more accurately and is better able to understand the intent of an expression. A correct interpretation of "The guy who says D'oh" is the cartoon character Homer Simpson, though "Homer" is not a keyword in the expression. An appropriate system for interpretation determines so through parsing, semantics, and trivia knowledge.

Consider a location where people negotiate or work on projects in turns, and they frequently say, "the ball's in your court". Keyword-based mapping will give false positive results to sports-related concepts.

Consider a location where certain people talk about clothing and often say, "I like that on you." Keyword-based mapping will fail to identify the concept of clothing.

A benefit of using natural language interpretation over keywords in emotion analysis is that it is possible to determine sentiments for particular entities, rather than simply in particular locations. Determining, for example, that people in a kindergarten love Elmo dolls, people in a high school laugh at Elmo backpacks, and people in an office building are annoyed by Elmo pop-up ads in web browsers can help advertisers decide where to place billboards with Elmo, how prominently to feature Elmo on the billboard, and how much to bid for the trademark rights to use the image of Elmo for advertising products.

Systems according to the invention, which use interpretations, can identify concepts implied by non-key words, and disregard false concepts, such as ones resulting from idioms. Therefore, mapping by interpretations produces more accurate thought maps than conventional keyword methods.

Database Organization

Some embodiments, such as those that require real-time analysis, provide information, identify emergencies, or take actions responsive to dynamically changing situations. Doing so requires fast data access and analysis. Such embodiments may use indexed real-time databases, such as Structured Query Language (SQL) databases localized to a single server. Using a single server avoids incurring latency for communication between servers.

Some embodiments are capable of storing more records than can be stored on a single server. In various embodiments, interpretation records are different sizes, and typically in the range of several kilobytes per record. Some embodiments are able to store trillions of interpretations. In some embodiments, speech recognition, interpretation, or other processing before storage requires several seconds of processor time. Such systems require widely distributed storage and processing. A framework of unindexed distributed database records such as Hadoop or other MapReduce type of system may be appropriate. Reading, filtering, and processing records from such distributed systems might take hours in some cases.

Some embodiments support both real-time and massively distributed data storage and access. Some such systems store recently captured records in an indexed real-time cache database and write the records to a distributed database after some time. Some such systems, when an interpretation is retrieved from distributed data storage, other records with the same or similar interpretation are loaded from the distributed database. Some such systems, in response to capturing expressions in one geolocation, load historical expressions within a particular distance of the geolocation. For faster determination of records to load into the cache, some systems restrict requests to geographically local data centers, data centers associated with a particular user ID, or data centers selected according to other environmental information. Some such systems maintain a score for each record in the cache database. The score depends on the age of the record access, the proximity of the record capture location to the location of one or more people, the phase of capture time of the record, and various other relevant information. When a new record arrives from the distributed database, the cache database evicts the record with the lowest score.

Some embodiments store interpretations based on location. This can have benefits in access speed. A geographic region is divided into strips along one range of longitude, with the strip width chosen to allow a small enough datasets for fast access to a selected strip. Interpretations may be sorted based on their position along their strip. Each strip is stored separately, such as on separate storage media. A search of a region spanning multiple strips can read the appropriate range of interpretation data within a strip simultaneously from each of the strip storage arrays. A search for a region smaller than a strip can get all data for a search from a continuous range within a single strip, or from two strips, if the location range happens to cross the boundary between strips. In some embodiments, strips consist of ranges of longitude. In some embodiments, the ranges are non-identical and chosen in order to ensure an approximately consistent number of interpretations in each range. This generally corresponds to the population of captured speakers within each longitudinal strip. Some such embodiments occasionally rebalance storage allocation by moving interpretation data from one strip to another. A strip to which new interpretations are added may be re-sorted. Some such embodiments make it possible to provide real-time advertising and virtual assistants for billions of people based on trillions of stored expression interpretations with practical numbers of storage devices and internet bandwidth.

Some embodiments represent locations on a grid of cells and provide separate data stores for each grid cell. Therefore, for search ranges less than a single grid cell, a search function might need to read from one, two, or four grid cell stores, based on whether the range crosses none, one horizontal or vertical, or both of a horizontal and vertical grid cell boundary. Some embodiments use grid cells of varying sizes, using larger cells for areas of lower expression density in order to make storage groups have approximately consistent amounts of data. Some embodiments compose large grid cells as collections of abutted small grid cells.

Some embodiments using either strips or grid-based storage, may segment data by region, such as for individual cities. The storage devices storing data for a particular location may be placed in data centers close to the locations represented by the data in order to minimize access latency and long-distance network bandwidth.

Some embodiments segment data in radial segments from a central point. Strips are thereby rings of specific widths. Like longitudinal strips, ring widths do not need to be consistent, though regular widths simplify and therefore speed up calculations of which ring in which to store and retrieve interpretation data. Some embodiments store rings in which the width of a ring is proportional to distance from a center. A benefit of rings is that, by placing the center at the center of a dense area, rings of consistent width will naturally tend to have similar amounts of data. Some embodiments use rings in and around urban areas, but for locations that fall outside of any urban ring, data is sorted by longitudinal strips. This keeps computation fast for most accesses, but requires only the more complex calculation in the exceptional cases of uses distant from urban areas.

Data Mining

Processing the raw database records may occur at different times including when a new expression is captured, when an analyst creates a thought map; and at intermediate times. Intermediate processing steps consume data from raw databases and transform it into data in a data mining database. This section describes the functioning of the data mining subsystem 91. The data mining subsystem retrieves records from the raw database, performs indexing, aggregation, and correlation on the data, and stores the resulting transformed data in a data mining database for use by analysts.

Not all records stored in the raw database are used to create mined data. Some embodiments ignore database records when their geolocation uncertainty exceeds a certain fraction of the display size because geolocation records of such interpretations are not meaningful. Some embodiments ignore or discard records whose age measurement exceeds a certain age limit, because old measurements are also inaccurate. Due to the world being ever-changing, the information value of expression interpretations decreases over time and becomes stale. Some embodiments combine age with a speed measurement: the faster the motion, the more recent measurements must be in order to be considered useful. Certain types of values fade out according to a known amortization scheme, such as decay, where the rate of decay depends on the type of information. Other embodiments remove values according a fixed expiration date, the duration of validity depending on the type of information.

Some embodiments perform data mining autonomously. Much of such data mining activity relies on scripts or programs that proactively and unconditionally perform certain analyses of the raw data. Some embodiments run analyses either periodically or in response to events. Some such embodiments perform analyses incrementally as they acquire raw data.

Examples of autonomous processing of raw database records include indexing a raw database according to values such as location, time, presence of syntactic constructs or semantic concepts, and any other aspects of interpretations. They also include collecting statistics of data, such as occurrence counts and histograms, concepts, location range data, time range data, multivariate histograms that cross-analyze two or more of the dimensions, multivariate histogram density estimation, and various other joint statistics of multiple measurements, including means and variances of the above data.

In some embodiments, data mining specialists drive data mining operations such as those described above and others that are more specialized. The mined data may be derived from the raw data by either automated scripts or commands from data miners. The embodiment collects the mined data 94 in a database of results. Some embodiments store geographical information in a spatial database such as one using the PostGIS format, in which functions such as distance, area, union, intersection, and specialty geometry data types exist, and can be added to the database. A spatial database is useful to store and retrieve data that represents objects defined in a geometric space. PostGIS is an open source and freely available spatial database extender for the PostgreSQL Database Management System.

Some embodiments compute salience for specific concepts as an indication of their local relevance. Salience indicates a concept's relevance in a place of interest as relative to other places. Salience is useful as a value on which to filter map results. It allows analysts and data miners to focus their work on the most valuable concepts and locations.

Some embodiments derive salience from 2-D density data as follows. A system obtains a measure of salience for a concept (such as a histogram count, weighted by a relevance weight) as the difference between two densities. The density of the concept at a small scale (averaged over a small range) is known as a narrow density. The density of the concept at a large scale (averaged over a large range) is known as a wide density. In some embodiments, the salience of a concept is the difference between the narrow density and the broad density. This corresponds to the use of a "center-surround" filter. Many variations of this design are possible. Some embodiments use the ratio of the two densities, rather than their difference. One reason is that, for making decisions against a threshold, the absolute density of a concept is not as important as its density relative to the background. Using ratios is closely linked to using the logarithm of densities. This presents some issues for near-zero densities. When using a ratio, it is advisable to add a bias term to both the numerator (narrow density) and the denominator (wide density) before the division, to avoid issues with small denominators, which cause ratios to shoot up. Using a large bias has the effect that the results of the ratio calculation approach those of the difference calculation. An intermediate value of the bias is best, such as a value scaled by the global statistics of the data, e.g. a median value of weighted saliences.

Salience, as described above, is a function of two scales, a narrow scale and a wide scale, that have to be defined. Some embodiments allow analysts to specify scale values. Another approach is to assign the narrow scale and a wide scale to specified multipliers, such as 5% and 30% of the displayed map size. Accordingly, zooming automatically adjusts the narrow and wide scale to the display. Given narrow and wide scales, local averages are made over rectangles, circles or other regions at these scales. Some embodiments compensate for edge effects.

Some embodiments for real time applications, such as dynamic advertising on mobile phones, use fast algorithms to access and analyze large datasets with rapid retrieval. Some embodiments organize the data into partitions. Some such embodiments store data in Hadoop in Parquet format for faster retrieval. Apache Parquet is a column-based storage format for Hadoop. Some datasets have many columns, but work with subsets rather than entire records. Parquet optimizes this type of work. Further, Parquet can compress data using snappy compression or alternative compression techniques. This reduces storage space requirements and access latency. Apache Spark and Spark-SQL, with Parquet, enable parallel and distributed access. Parquet, for example, can boost Spark SQL performance by 10 times compared to using text. This is due to the low-level reader filters, efficient execution plans, and good scan throughput. Using Parquet with compression typically reduces data storage by 75% compared to text.

Analyst Requests and Responses

Figure 7:
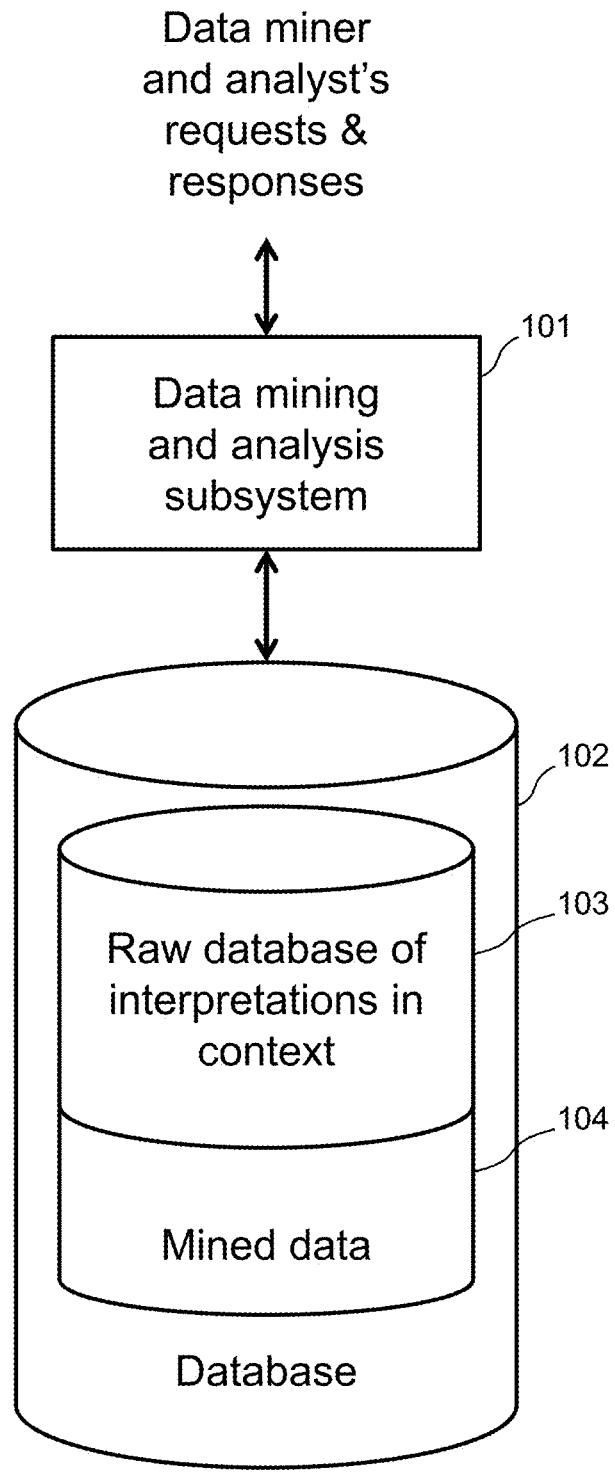
FIG. 7 illustrates an integrated embodiment of a data mining and analysis subsystem according to an embodiment.

In some embodiments, analysis is performed based on the mined data. In some embodiments, analysts additionally mine data for special purposes beyond the mining performed by data miners. FIG. 7 illustrates an embodiment that presents a uniform interface available to data miners and analysts. A data mining subsystem 101 provides access to a database 102. The database 102 comprises a database of interpretations and their context 103. The database 102 also comprises a database of mined data 104. In this integrated system, the distinction between data miners and analysts is that data miners work for a data provider, and analysts are the clients of the data provider. In some embodiments, the functionality available to analysts is a subset of the functionality available to data miners. The embodiment of FIG. 7 groups all data (the raw database and the mined data) in a single joint database 102.

Analyzing data mined from the raw database, in various embodiments, involves lookups, filtering, to retrieve a subset of data, aggregating aspects of the retrieved data, counting, matching, comparing, ranking, percentile calculation, building histograms, approximating distributions, displaying relationships of the aggregated data to regions, and other data processing functions. An example of a type of analysis is to count, for each region in a set of regions, interpretations or concepts with a specific property. One such property is the presence of a particular entity. For example, it might be useful to count the number interpretations that include a fast food concept during a particular time period, such as between 5:00 pm and 7:00 pm. For analysis to be useful, databases must have a statistically significant number of occurrences of expressions with the particular property.

Some embodiments enable analysts to filter database records according to the presence of particular entities. Some embodiments allow analysts, additionally or alternatively, to filter results according to specific ranges of values of particular attributes of particular entities. For example, it may be useful to retrieve concepts from interpretations of expressions that were collected within a specific location and time period. In some embodiments, such filtering is based on matching more complex semantic relationships. For example, a query interpretation may be constructed to find one or more interpretations that are similar to the query interpretation for some measure of similarity. The degree of match between two interpretations (such as a query interpretation and a derived/stored interpretation) is measured through fuzzy matching that occurs between the query interpretation and an interpretation stored in the database, or the corresponding concepts. In embodiments whose interpretations are based on semantic graphs, the relative overlap of two semantic instances indicates a degree of match. In some embodiments, the similarity of query interpretations and derived interpretations stored in a database are computed as a Jaccard index. In some embodiments, graph matching techniques are used to find overlapping subgraphs. The maximally matching subgraph is determined, and a relative overlap factor is measured based on the size of the maximally overlapped graph, and the ratio of its size relative to the database interpretation graph's size. In all these similarity measures, weights are used to express the similarity of individual nodes or edges, and to give certain node types or concepts a greater weight.

Some embodiments use the highest Jaccard index value to select the stored interpretation that best matches the query interpretation. Some embodiments choose a particular number of stored interpretations with the highest index values. Some embodiments apply a fixed threshold coefficient value to determine a match set of stored interpretations.

Some embodiments, instead of or in addition to a Jaccard index, calculate match scores between query interpretations and interpretations stored in database records using one or more of hamming distance, cosine similarity, and edit distance, among other conventional similarity scoring algorithms.

Some embodiments compute interpretation match scores based on presence of entities. Some embodiments refine the scores by similarity of attribute values. Some embodiments boost the score for entities with matches between the presences of defined attributes.

Various embodiments provide various tools for analysts to define desired analysis and display of output. Some embodiments provide user interfaces, like ones found in spreadsheet software, for users to create formulas for data processing. Some embodiments allow users to create custom formulas. Some embodiments accept formulas programmed in text-based scripting or programming languages. Some embodiments allow filtering and searching using regular expressions.

Analysts are generally interested in receiving selected information about the mined data. In some cases, already mined data is sufficient for an analyst to find the answers the analyst seeks. In some such cases, simple or more advanced display tools allow an analyst to explore the relationships of interest.

Various embodiments allow analysts to use mined data to create a thought map. A thought map shows the result of analysis of raw or mined data positioned on a map of one or more geographical regions. A thought map may be embodied as a visual display, such as a computer screen, or a virtual reality display of a geographical heat map. Some embodiments provide a two-dimensional visual display showing multiple layers of data overlaid with a map. In some embodiments the map is scalable. Some display tools can show time data. Some embodiments use auditory displays.

Some embodiments render geographical maps in browser windows, e.g., using a language such as JavaScript. In some embodiments, the display of interpretations is a mashup with another geographical map rendering API such as Google Maps.

Some embodiments use displays other than browser windows, such as custom designed computer GUIs or paper printouts. Some embodiments provide a web API for third party developers to access interpretation data.

In some embodiments, interpretations are displayed using words, geographically placed based on the center of their expression, but placed based on a force-directed drawing algorithm. In some embodiments, the font size used to display interpretation-derived text depends on its frequency of use in expression interpretations, relative to the weighted frequency of use of other expression interpretations. In some embodiments, the size of a text rectangle is based on a frequency, and the font size is adjusted so that its rectangle is proportionally scaled.

One type of heat map shows the emotional charge of expressions, which can be expressed as a grey transparency map overlay in which a dark grey level conveys the negativity of the emotional charge of concepts in the expressions. One type of heat map displays information about the emotional content of expressions. Some embodiments map emotional content to a color scale and render it as a map overlay, such as, e.g., joy=yellow, sadness=blue, disgust=green, fear=violet, anger=red, as in the Pixar movie "Inside Out."

Concepts implied, but not directly expressed in expressions, such as "the ball's in your court", appear on the map. Directly-expressed concepts appear if an analyst adjusts the level of concept strength threshold in a filter. Some embodiments allow an analyst to list particular concepts of interest, in which case general concept strength is reduced in determining which to present, and concepts with significantly strong graph-connection weight to directly expressed concepts are boosted in the display.

Figure 10:
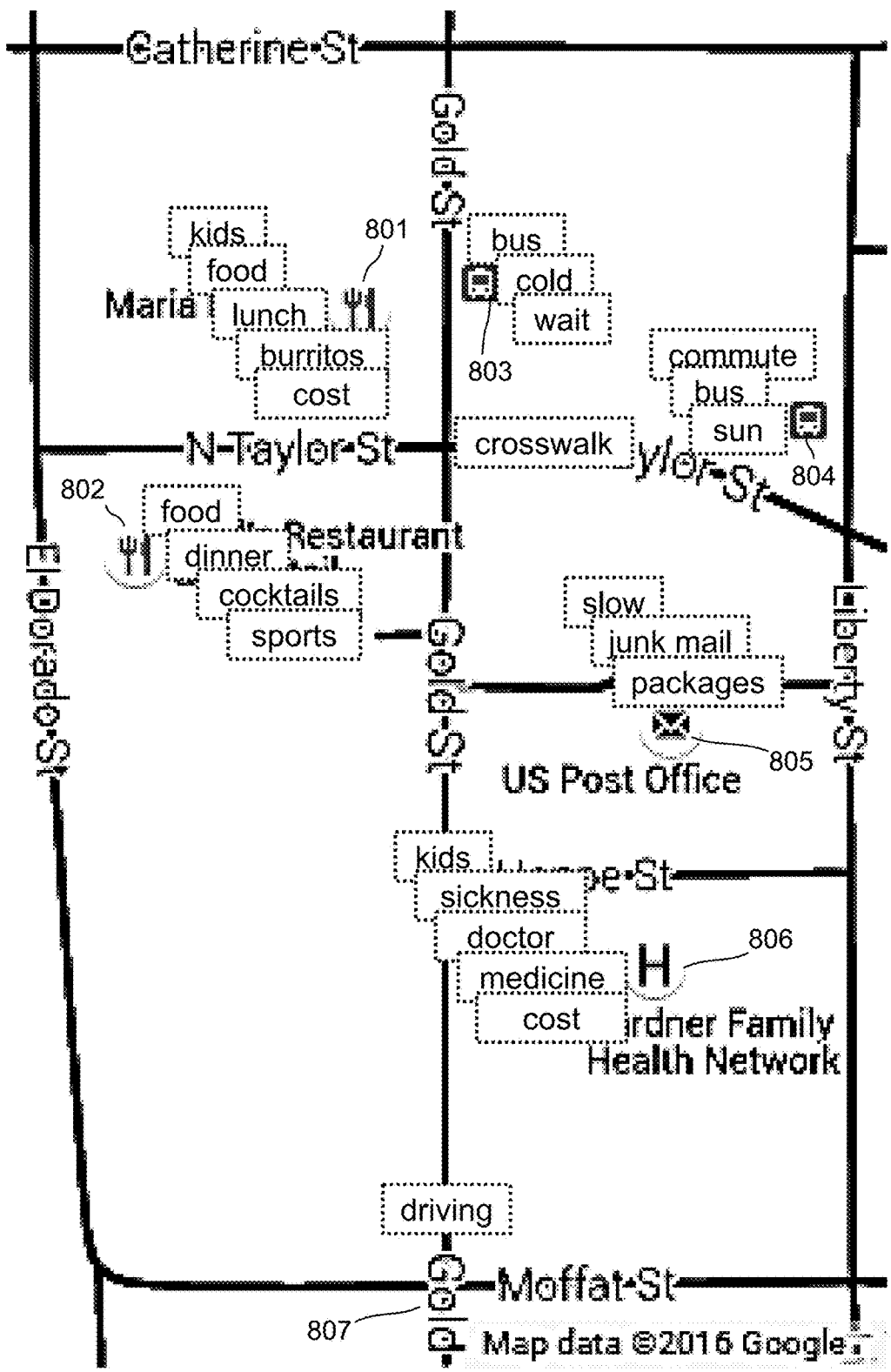
FIG. 10 illustrates a geomap with indications of concepts and locations where they were expressed according to an embodiment.
Figure 11:
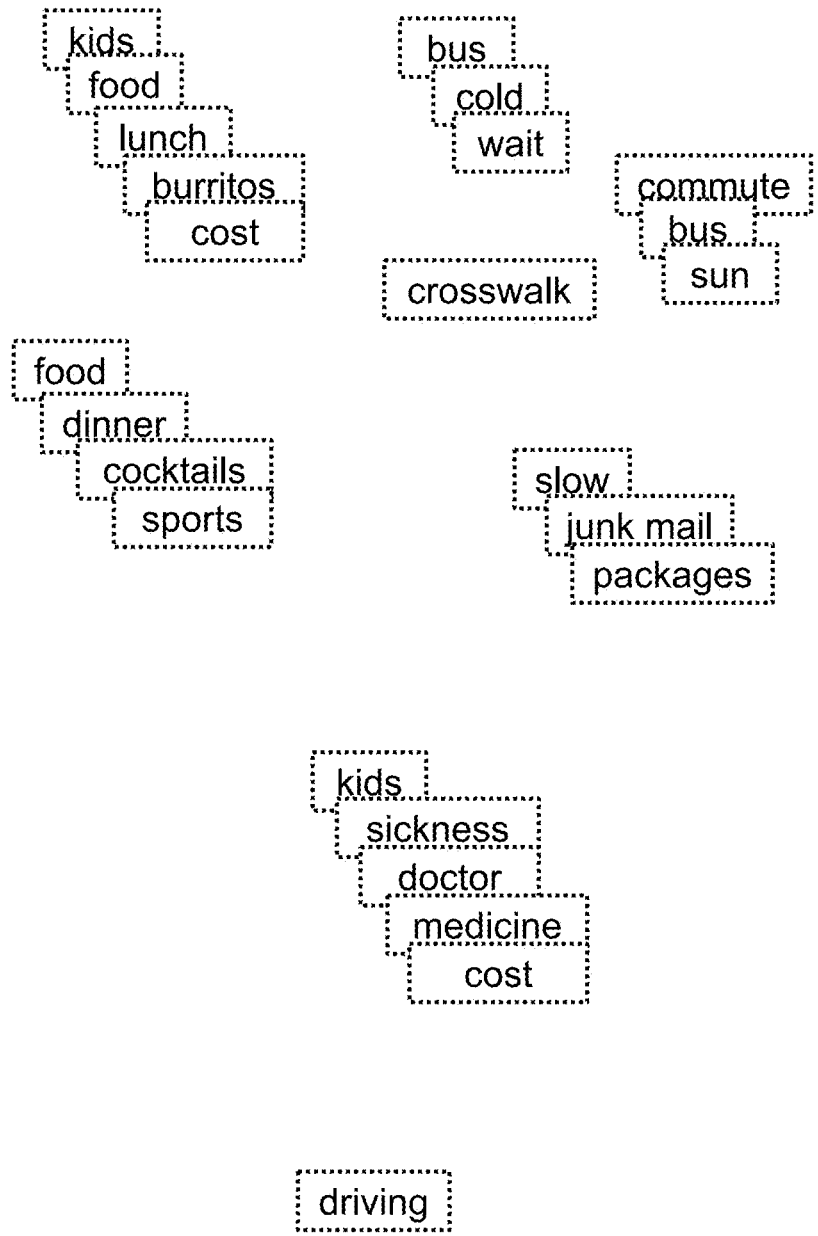
FIG. 11 illustrates locations of expressed concepts according to an embodiment.
Figure 12:
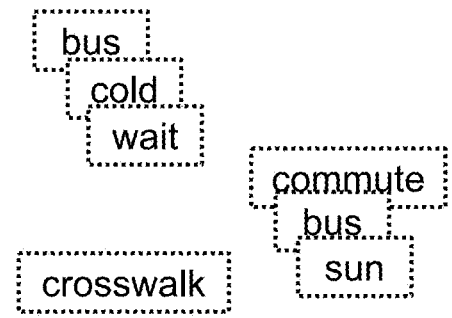
FIG. 12 illustrates locations of expressed concepts filtered for a morning time range according to an embodiment.
Figure 12:
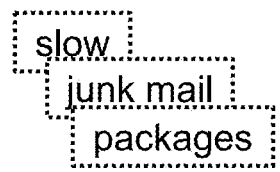
Figure 12:
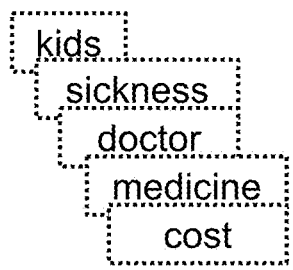
Figure 12:
Figure 13:
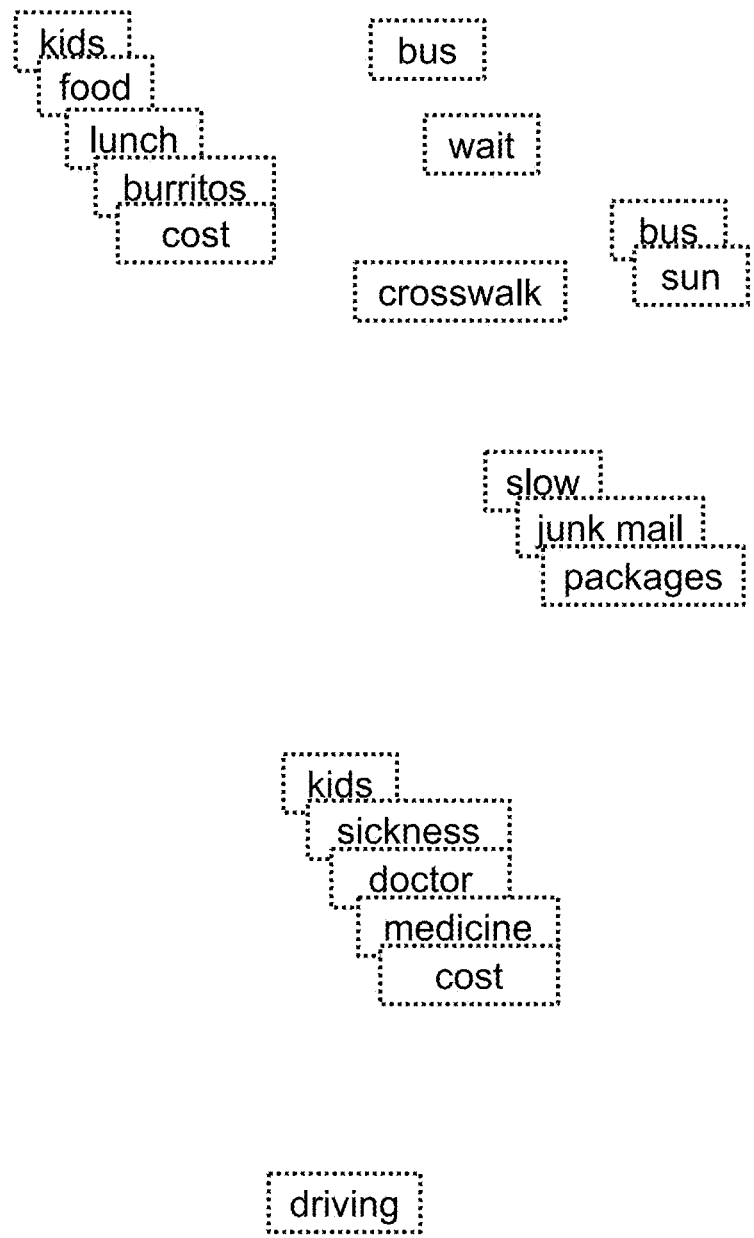
FIG. 13 illustrates locations of expressed concepts filtered for an afternoon time range according to an embodiment.
Figure 14:
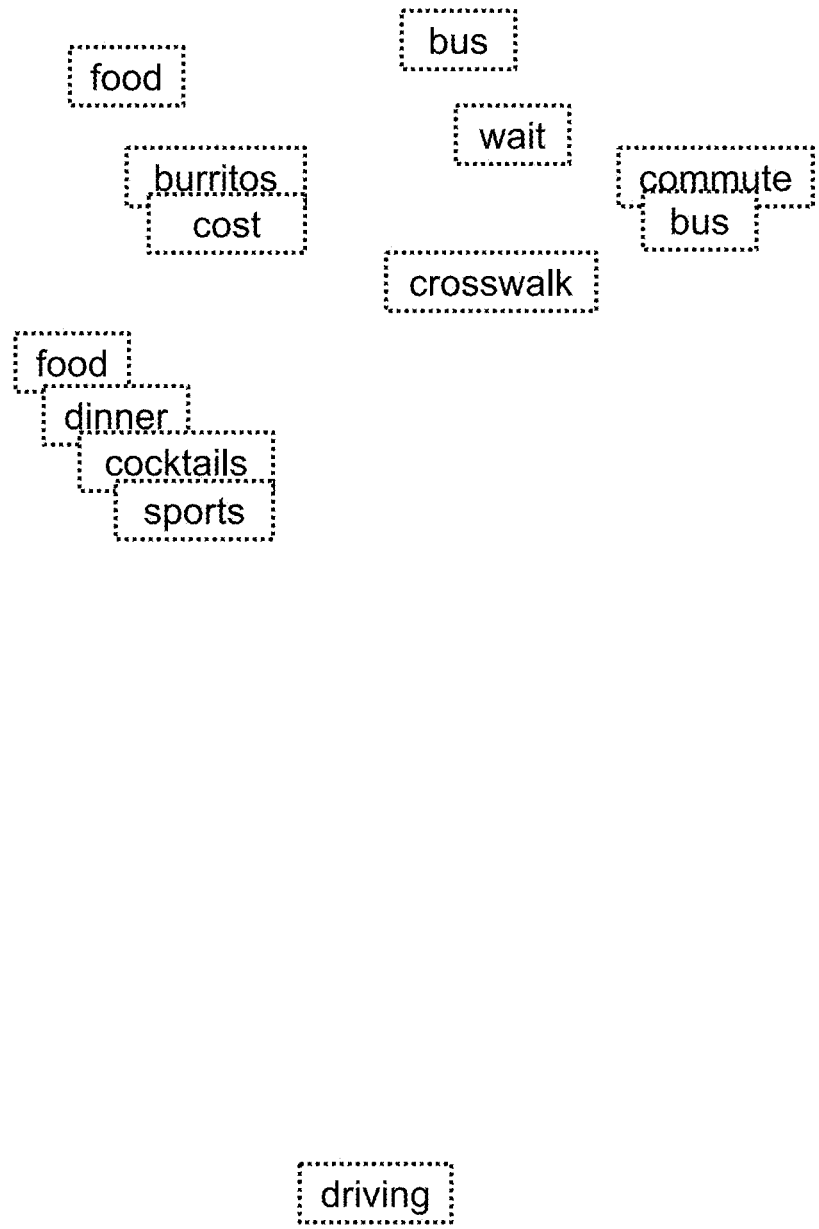
FIG. 14 illustrates locations of expressed concepts filtered for an evening time range according to an embodiment.

FIG. 10 illustrates a geomap with indications of concepts and locations where they were expressed according to an embodiment. FIG. 11 shows the concept layer from FIG. 10, without the base geographical map. Some embodiments allow analysts to filter displayed results based on a time range. Some embodiments allow filtering based on time of day. FIG. 12 shows concepts expressed in the morning, FIG. 13 shows concepts expressed in the afternoon, and FIG. 14 shows concepts expressed in the evening.

Another type of thought map is a regional map with regions highlighted based on the number of captured expressions with certain properties. For example, if an analyst applies a filter for expressions about food, the map will show the density of such expressions within each cell of a grid over the map region. Some embodiments display, for each location, the concepts of greatest salience. Some embodiments display, for each concept, the location at which the salience is greatest. the expression properties of greatest salience near their location of highest salience. For example, if an analyst queries for the most common concepts expressed within a displayed map region, the map display may show words representing the concepts most frequently expressed. In some embodiments, where displayable properties tend to overlap or become crowded, a visualization system makes only the properties or concepts of greater salience visible. When an analyst changes zoom level, the system recalculates heat map layers, densities, salience, and all visibility decisions.

Some embodiments display, for each location in which an expressed concept matches a specified filter concept, a marker such as a dot is rendered. Some systems allow for zooming in and out, and merge dots that are closer together than a particular level of resolution. Some systems allow for placing a pointer, such as one controlled by a computer mouse, over an expression marker; in response to such hovering, such systems pop up a display that reveals the text of one or more expressions indicated by the marker or reveal a selected aspect of the interpretations. Some systems render markers using different colors and shapes based on specified entities or values of entity attributes and emotions in the expressions. Some systems overlay different types of information, such as different colors, and text.

Figure 8:
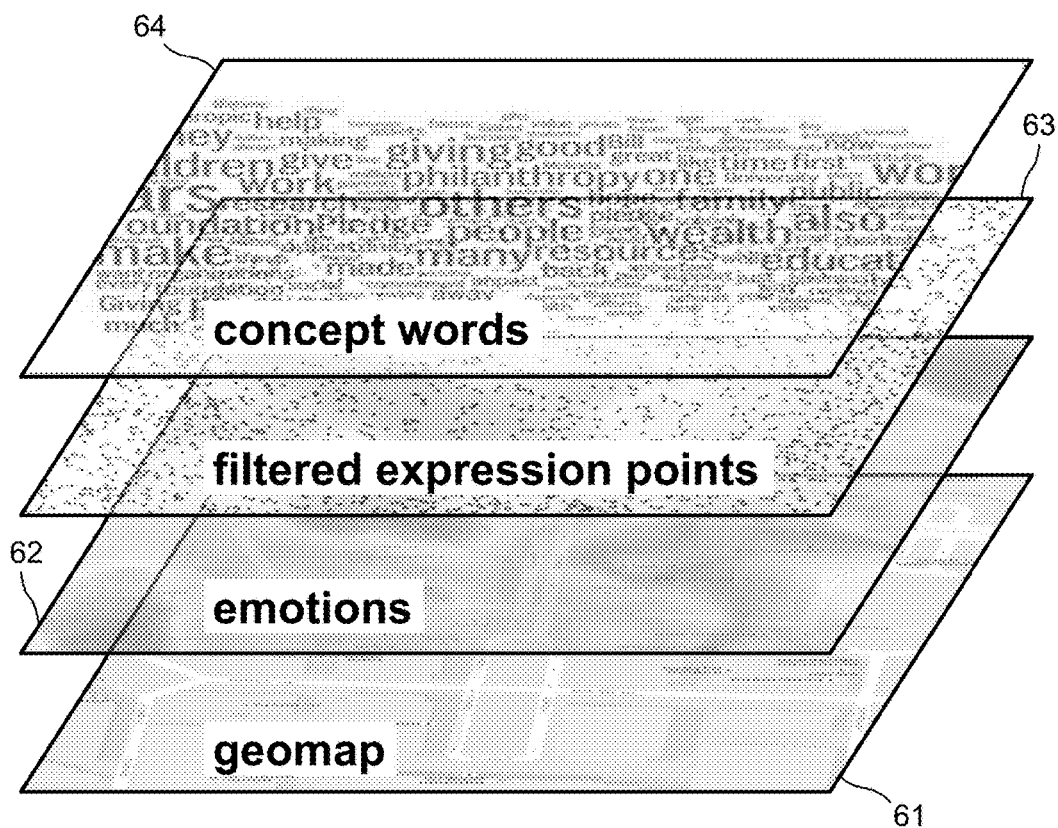
FIG. 8 illustrates map layers, including a geomap, an emotion overlay, an overlay of filtered expression points, and an overlay of concept words according to an embodiment.

FIG. 8 shows an embodiment of map layers in an exemplary display. A base layer 61 displays a geographical map, such as one obtained from Google Maps. A second layer 62 displays an emotion heat map as a semitransparent overlay over the first layer. A third layer 63 is an overlay of dots showing points at which interpreted expressions have been captured. The display only displays points whose interpretations and associated data match a specified filter, such as, for example, expressions gathered in the evening, whose concepts involve eating or drinking, and that express questions about, or opinions about, places to eat or drink. The top layer 64 is an overlay of concept words chosen as representative of the interpretation concepts.

Every layer in a display such as FIG. 8 is sensitive to scale. One clear reason for this is that the information density that can be packed into each display layer is limited by its legibility. It is useful and important, not only to limit the amount of data on a display layer, but to select carefully what data will be displayed, for a specific purpose and at scale. If the purpose provides a yes-no filter, only filtered data will be considered. If the purpose provides a gradual measure of relevance, statistics (such as measures of popularity) will be weighted by relevance.

Thought maps do not need to represent locations according to terrestrial geography. Some embodiments represent a thought map as a landmark graph. A landmark graph is a graph in which each node represents a landmark and each edge represents a linear distance between the nodes it connects. Some embodiments display the graph visually, to scale, with edges representing greater distances drawn as longer than edges representing closer distances. Some embodiments annotate the edges with a distance measure.

In an example graph, one node represents a particular big tree and another connected node represents a particular stop sign that is noteworthy to travelers because a vandal made a hole in it. The node representing the stop sign with a hole connects to a node that represents a particular vending machine.

Figure 9:
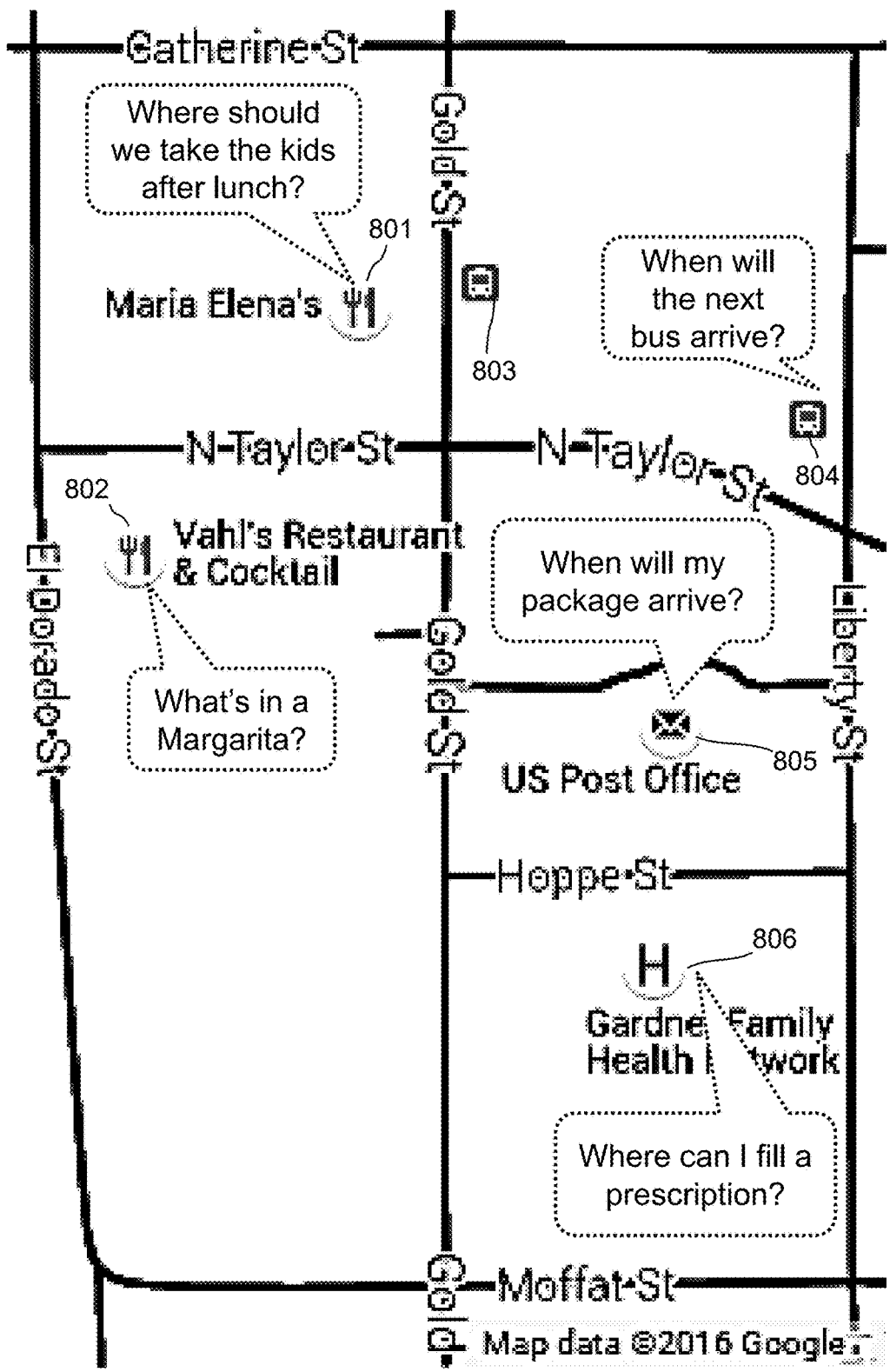
FIG. 9 illustrates a geomap with indications of locations of natural language expressions according to an embodiment.

Some embodiments can build another example graph from expressions made by passengers giving directions to drivers, such as when traveling in the town shown on the map in FIG. 9. One node represents a location in which the passenger said "turn onto Gold Street". That node connects to a node that represents a location in which the passenger said "turn onto Catherine street". That node connects to a location in which the passenger said "turn onto N Taylor Street". That node connects to a location in which the passenger said "turn onto Hoppe Street". That node connects to a location in which the passenger said "turn onto Moffat Street". Connecting the nodes, based on the order in which the passenger made the expressions makes a graph of driving action points. Graph edges indicate the amount of time between each node, as derived from analyzing time between different passengers' direction-giving expressions.

Representing locations by node/edge graphs can, for some applications, be even more useful than maps that represent locations geographically. For example, in an application for displaying advertisements on a mobile phone, it is important to know when a consumer, moving from node to node, will likely soon arrive at a node near a particular place of business. Such a system would display an ad shortly before the consumer arrives. Using a strictly geographical map, to provide an advertisement with such accurate timeliness, a system would have to know a trajectory, speed, and expected changes to speed and trajectory in order to estimate the best time to display an ad.

Uses of the Data

In some embodiments, data analysts exploit the results found in the mined data to achieve specific purposes. The raw and mined data stored in the databases may include more information than is needed for a particular use of the data. Attributes of interpretations such as personal information (for example, the name and phone numbers of particular people), time, or emotional content can be ignored if not needed.

In some embodiments, data analysts are agents of advertising companies, who seek to select the best location for billboards on which to place an advertisement for a specific product or service.

Another use of the mined data is predicting user behavior. Some embodiments, shortly after capturing an expression, interpret the expression; identify one or more identifiable behaviors; and store the interpretation and the behavior as a record in a database. Some embodiments identify and store multiple behaviors in each database record. Some embodiments capture movement behaviors, such as direction and magnitude of movement as detected by an accelerometer, or a change in location or speed as detected by a satellite geolocation system. Some embodiments capture purchasing behavior following expressions.

Some embodiments compare a recently received interpretation from a specific user to previously stored interpretations for many users to crowdsource predictions. By doing so, rather than predicting a user behavior solely by the user's previous behavior, a system can predict the user behavior from the behaviors of others following similar expressions. Some embodiments store related user IDs with interpretation records in the database to associate expressions with particular users. Such embodiments filter interpretations from the database for comparison in order to personalize predictions for individual users. Since individual users have unique behavior patterns, by personalizing predictions, rather than crowdsourcing predictions, a system can predict an individual's behavior more accurately if the system has personalized behavior history available.

Identifying sequences of interpretations is useful for analysis that predicts sequences of thoughts. Some embodiments store an interpretation derived from a recently captured expression with a link to the interpretation derived from the previously captured expression, the interpretation of the next captured expression, or both. Identifying an individual person's sequences of thoughts allows prediction and customization of systems to provide assistance or advertising to the users. For example, if a user, tends to expresses thoughts about cooking dinner shortly after expression thoughts about picking up children from day care, then a system, when detecting an expression about day care, can predict that the user will soon think about cooking dinner. Identifying patterns of sequences of thoughts between people, such as ones engaging in conversational dialog, provides for analysis of human psychological behavior, and the effects of particular expressions on the thoughts of listeners.

Incidentally, identifying sequences of interpretations is also useful for disambiguating expressions with multiple reasonable interpretations, such as, "Ed wanted to impress the girl with the pearl necklace".

In another example, an electronic billboard detects the approach of particular people, and changes before they arrive. Such billboards in public places shared by many people detect commonality between interpretations of each one's recent expressions, and choose ads based on the common interest.

In another example, a public safety system detects interpretations related to danger and strength of the interpretation and associated emotion map. When multiple such expressions occur within close proximity, based on the location and direction of movement of people making the expressions, the system identifies the likely source of the danger. This is useful such as in case of a criminal shooting, around the epicenter of an earthquake, or at serious car accidents.

For example, localized density spikes in the concept maps for concepts related to car accidents, or slow traffic, can allow public safety systems to identify incident locations before callers can describe a location with sufficient accuracy for a response. Expressions about offers to buy black market items or substances, such as certain narcotics, indicate particular locations, and times of day that police patrols can most effectively improve neighborhood safety.

Some embodiments are useful for epidemiology. Filtering interpretations for expressions explicitly indicating disease symptoms, or concepts implicitly related to disease symptoms allows mapping of density and spread of communicable illnesses. This can direct the distribution of medicines and travel patterns of doctors and directed application of resources to improve sanitation or identify sources of environmental hazards.

Time period filtering allows analysis of recurring disease spread throughout a year. Signal processing on changing density data indicates per school zone of greatest weekly fluctuation. This indicates schools or workplaces where disease, such as influenza, spread is more frequent, and sanitation needs improvement.

A method of predicting disease outbreak, according to some embodiments, is to analyze historical expression interpretations in advance of explicit indications of disease symptoms.

Discarding personal identification information, and averaging individual interpretations in advance of otherwise-detectable disease indication allows the identification, and weighting, of predicted expressions. Though detecting such thoughts on an individual basis is a very inaccurate predictor of impending health problems, detecting changing concepts in expressions across large numbers of people within close geographical proximity, and controlling for affecting current events, can indicate increased probability of an impending epidemic. Current events may have a very large influence on expressions. For example, airing of a television show about sharks will cause a widespread increase in all aquatic and marine related expressions. However, current events may cause high-frequency spikes within identifiable relationships between concept interpretations, whereas low-pass filtering changes in frequency of concepts is indicative of broader epidemiological trends in the condition of the population.

Some embodiments that use landmark graphs (as described above) are useful for navigation. Even if satellite constellation-based geolocation systems, such as GPS, Galileo, GLONASS, and BeiDou are unavailable such as for navigation in indoor locations such as underground shopping malls, jamming, or military attack, thought mapping can provide for precise navigation. Such as system filters interpretations for ones specifically about present locations. For example, "I am at SoundHound" would be included, but "I am going to The Computer History Museum" would be ignored. The speaker indicates to the system a destination and local landmarks in the current location. The system then instructs the user a direction for travel, and a several identifiable landmarks expected along the route. When the user requests the next step, the system indicates a next set of landmarks. This is superior to simple landmark-based navigation using data sources such as Google Maps because such maps only have limited information, such as about the locations of businesses and particular sites of interest. A large databases of interpretations has many fine-grained location-identifying clues from as past expressions such as, "What a big tree", "Look mom, somebody shot a hole in that stop sign", and "This [vending] machine ate my dollar". Children are particularly good sources of landmark data. Because of their tendency to verbalize what they learn about the world, they provide many expressions about notable landmarks about which few adults would comment. By collecting expressions with geographical relevance, a landmark graph provides an association between expression and places, places being represented by particular objects.

Some embodiments are useful for investigating crimes and finding terrorists or rebels as they plot. A system takes in a set of interpretations from an investigator, matches them to concepts derived from interpretations, and returns a list of locations at which they were expressed. Some embodiments take in sets of relevant interpretation values, such as connections to specific people, filter the database for expressions containing that information, and return lists of locations.

Some such embodiments maintain a person entity graph with a node for each identifiable speaking person and a directed edge to each other person who the speaker ever mentioned in an expression. Edges also comprise information about discernable relationships between people, as well as frequency and recency of mentions. Person nodes accumulate attribute-value pairs over time as they can be determined from captured expressions. Similar person-graph embodiments may be useful for advertisers.

Advertising Use Case and Example

The use of mined data may be applied to selecting a location in which to invest resources. An example of investing resources in a location is choosing the location of a billboard for advertising. Some embodiments accept ads from ad buyers and compute their relevance at any given location and time. Some embodiments further consider the circumstances of consumers in choosing ads to present. The ad buyers specify at least concepts and regions of interest in their bids. In some embodiments, ad buyers may express functions of concepts and region ranges. An example concept function is whether expressions include the concept of Chinese food. Another example of a concept function is if a weather concept is expressed, does it contain concepts related to being hot, cold, or neither.

Various embodiments allow ad buyers to specify regions by one or more of zip code, geopolitical definition, point of interest, latitude-longitude ranges, or by custom locations boundaries, such as locations within view of a billboard. Other methods of specifying filters are possible, including specifying phases within a time period, ranges of emotions, user attributes, and the like.

If a consumer makes an expression within the bid region of an ad, then the ad enters the bidding contest and ad bid functions run on the expression's interpretation. Some embodiments select an advertisement based on a fixed bid amount. Some embodiments take into account a distance weighting function, which affects an ad's bid amount in proportion to the distance of the expression's location to a central location specified for the bids. In some embodiments, an ad's bid amount considers a conceptual distance function between the expression's interpretation and the concepts specified for the bids. Ad providers use proprietary formulas, any of which are appropriate for implementation of embodiments of the present invention. Some embodiments use the highest bid amount to select an ad from the ad database for display.

Various embodiments present selected ads on billboards, display them on mobile devices such as a phones or automobiles, or play them as audio segments on mobile or fixed devices. Any method of ad delivery may be used.

Some embodiments allow ad buyers to specify a bid amount as a function of one or more of semantic information from expressions, environmental information, and information provided in response to a request for information or an action. Some examples of environmental information are demographic attributes, emotion, phase within a period, and one or more specific person IDs.

Some embodiments present ad buyers with geographical insight into expression interpretations. FIG. 9-15 illustrates a simple scenario of using of such an embodiment. FIG. 9 shows a geographical map of a small town with Maria Elena's Mexican restaurant 801, Vahl's restaurant and bar 802, two bus stations 803 and 804, a US post office 805, and a Gardner Family health clinic 806. The system captures queries spoken to a virtual assistant app on mobile phones. Over the course of a day, at Maria Elena's 801, a person asks, "Where should we take the kids after lunch?"; at a bus station 804 a person asks, "When will the next bus arrive?"; at Vahl's 802 a person asks, "What's in a Margarita?"; at the post office 805 a person asks, "When will my package arrive?"; and at the health clinic 806 a person asks, "Where can I fill a prescription?".

FIG. 10 shows salient concepts accumulated throughout a given day, and geographically, in the town. In and around Maria Elena's 801, kids, food, lunch, burritos, and cost were expressed prominently. On the shady side of the block near a bus stop 803, concept words such as bus, cold, and wait were expressed in the morning; near the bus station 804 on the sunny side of the block, commute time, bus, and sun were expressed. At Vahl's restaurant 802, food, dinner, cocktails, and concept words in the sports domain were expressed. Throughout the evening, expressions were made about different sports. Since every particular sport has a strong relationship with the concept of sports, in general, sports gains a higher weight than any individual sport. On a day with, for example, a very popular basketball game, this basketball concept might outweigh the concept of sports, in general. Throughout the day, at the post office 805, slow, junk mail, and packages were expressed. At the health clinic 806, kids, sickness, doctor, medicine, and cost were expressed. Driving concepts were expressed on Gold street, heading out of town 807. Specifically, various concepts related to driving were expressed throughout the day, and so the broader concept of driving appears with significant strength on the map. This effect, just like the sports example, depends on a hierarchy of concepts, represented taxonomically in the thought mapping system.

Figure 15:
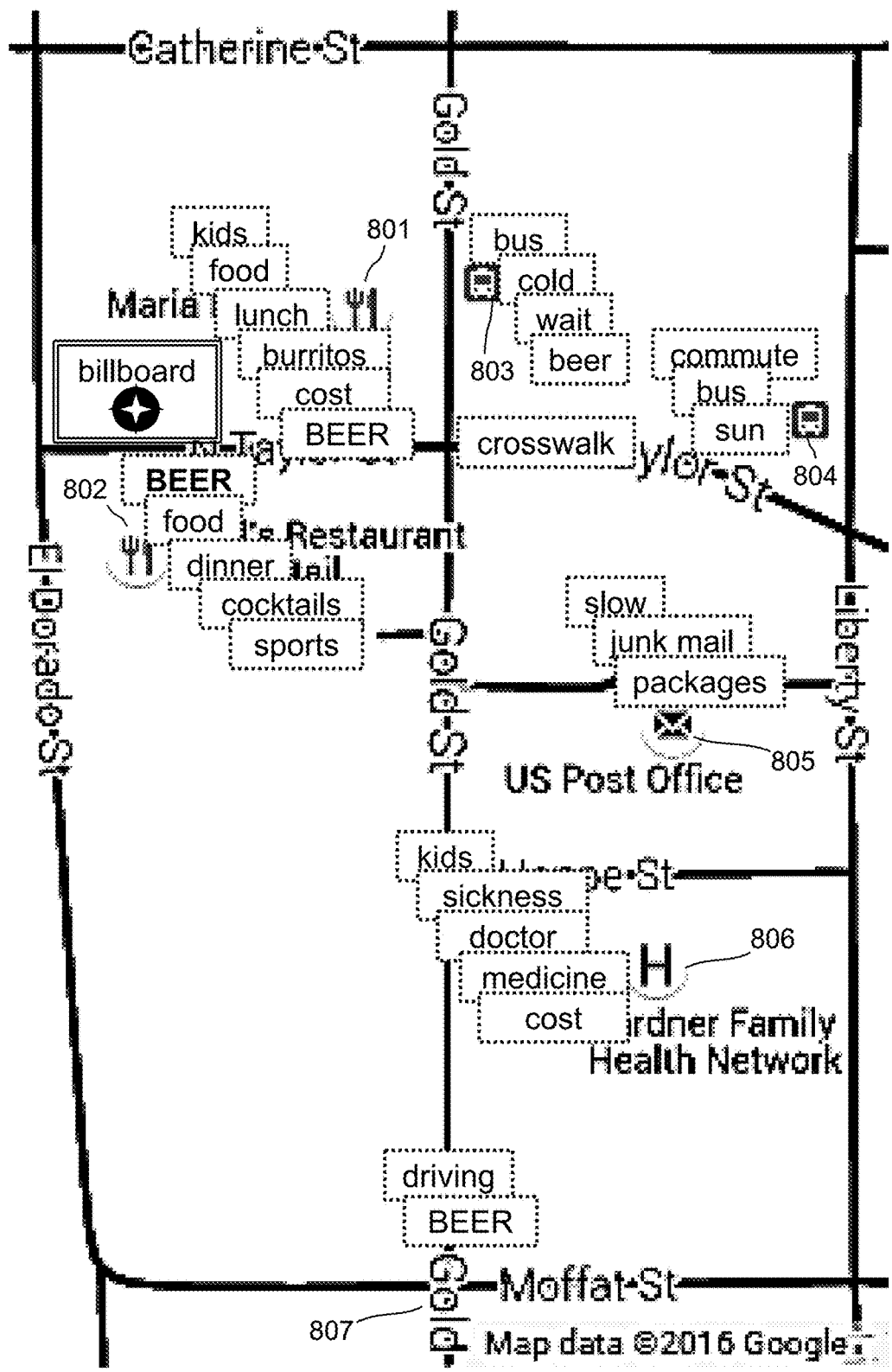
FIG. 15 illustrates a geomap within a billboard advertising beer, and expressed concepts according to an embodiment.

After analysis of the geographical interpretation map of FIG. 10, a beer advertiser decides to bid on an advertisement on a billboard between Maria Elena's restaurant 801 and Vahl's bar 802, as shown in FIG. 15. The system analyzes expressions over the course of a month following placement of the billboard. A follow-up analysis shows that beer is expressed at the bus stop 803, strongly at Maria Elena's restaurant 801, very strongly at Vahl's bar 802, and even by drivers on Gold Street 807. Capturing and interpreting expressions allows the advertiser to measure the success of the particular ad, but also the ability of the billboard to influence people's thoughts. A billboard's influence depends on its placement, orientation, and its surrounding environment.

FIG. 16 is a block diagram of an example computer system. A computer system 1610 typically includes at least one processor 1614, which communicates with a number of peripheral devices via a bus subsystem 1612. These peripheral devices may include a storage subsystem 1624, comprising for example memory devices and a file storage subsystem, user interface input devices 1622, user interface output devices 1620, and a network interface subsystem 1616. The input and output devices allow user interaction with the computer system 1610. A network interface subsystem 1616 provides an interface to outside networks and is coupled via the communication network to corresponding interface devices in other computer systems.

User interface input devices 1622 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into a computer system 1610 or onto a communication network.

User interface output devices 1620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 1610 to the user or to another machine or computer system.

The storage subsystem 1624 stores programming and data constructs that provide the functionality of some or all of the modules described herein, including the logic to create inferred queries for use as query suggestions according to the processes described herein. These software modules are generally executed by a processor 1614 alone or in combination with other processors.

Memory 1626 used in the storage subsystem can include a number of memories including a main random access memory (RAM) 1630 for storage of instructions and data during program execution and a read only memory (ROM) 1632 in which fixed instructions are stored. A file storage subsystem 1628 can provide persistent storage for program and data files, and may include a hard disk drive, a floppy disk drive along with associated removable media, a CD-ROM drive, an optical drive, or removable media cartridges. The modules implementing the functionality of certain embodiments may be stored by the file storage subsystem 1628 in the storage subsystem 1624, or in other machines accessible by the processor.

Bus subsystem 1612 provides a mechanism for letting the various components and subsystems of the computer system 1610 communicate with each other as intended. Although bus subsystem 1612 is shown schematically as a single bus, alternative embodiments of the bus subsystem may use multiple busses.

The computer system 1610 can be of varying types including a workstation, server, computing cluster, blade server, server farm, or any other data processing system or computing device. Due to the ever-changing nature of computers and networks, the description of the computer system 1610 depicted in FIG. 16 is intended only as an example for purposes of illustrating the preferred embodiments. Many other configurations of computer system 1610 are possible having more or fewer components than the computer system depicted in FIG. 16.

What is claimed is:

1. A method of predicting a person's behavior, the method comprising:
    storing, in a database, interpretations of prior natural language expressions obtained from a user device and one or more geolocation based movement behaviors of the user device that occurred within a specific amount of time after the prior natural language expressions were received, each of the stored one or more geolocation based movement behaviors being related to one or more of the stored interpretations of the prior natural language expressions;
    receiving a current natural language expression after the one or more geolocation based movement behaviors occurred;
    interpreting the current natural language expression to create a current interpretation;
    comparing the current interpretation to the stored interpretations of the prior natural language expressions to identify a closest matching stored interpretation of the stored interpretations;
    predicting the person's geolocation based movement behavior by selecting a stored geolocation based movement behavior, of the stored one or more geolocation based movement behaviors, related to the closest matching stored interpretation; and
    providing the person's predicted geolocation based movement to an entity.

2. The method of claim 1, further comprising:
    storing, in the database, user IDs in association with the stored interpretations of the prior natural language expressions; and
    filtering the database according to a current user ID of a user that uttered the current natural language expression,
    wherein the filtering selects, from among the stored interpretations, interpretations that are associated with user IDs that match the current user ID.

3. The method of claim 1, wherein the prior natural language expressions are unrelated to an operational function of the user device.

4. At least one non-transitory computer readable medium storing code that, if executed by at least one computer processor would cause the at least one computer processor to:
    store, in a database, interpretations of prior natural language expressions obtained from a user device and one or more geolocation based movement behaviors of the user device that occurred within a specific amount of time after the prior natural language expressions were received, each of the stored one or more geolocation based movement behaviors being related to one or more of the stored interpretations of the prior natural language expressions;

receive a current natural language expression after the one or more geolocation based movement behaviors occurred;

interpret the current natural language expression to create a current interpretation;

compare the current interpretation to the stored interpretations of the prior natural language expressions to identify a closest matching stored interpretation of the stored interpretations;

predict the person's geolocation based movement behavior by selecting a stored geolocation based movement behavior, of the stored one or more geolocation based movement behaviors, related to the closest matching stored interpretation; and provide the person's predicted geolocation based movement to an entity.

5. The at least one non-transitory computer readable medium of claim 4, wherein the code, if executed by at least one computer processor further causes the at least one computer processor to:

store, in the database, user IDs in association with the stored interpretations of the prior natural language expressions; and filter the database according to a current user ID of a user that uttered the current natural language expression, by selecting, from among the stored interpretations, interpretations that are associated with user IDs that match the current user ID.

6. The at least one non-transitory computer readable medium of claim 4, wherein the prior natural language expressions are unrelated to an operational function of the user device.

7. A system including one or more processors coupled to memory, the memory loaded with computer instructions to predict a person's behavior, the instructions, when executed on the processors, implement actions comprising:

storing, in a database, interpretations of prior natural language expressions obtained from a user device and one or more geolocation based movement behaviors of the user device that occurred within a specific amount of time after the prior natural language expressions were received, each of the stored one or more geolocation based movement behaviors being related to one or more of the stored interpretations of the prior natural language expressions;

receiving a current natural language expression after the one or more geolocation based movement behaviors occurred;

interpreting the current natural language expression to create a current interpretation;

comparing the current interpretation to the stored interpretations of the prior natural language expressions to identify a closest matching stored interpretation of the stored interpretations;

predicting the person's geolocation based movement behavior by selecting a stored geolocation based movement behavior, of the stored one or more geolocation based movement behaviors, related to the closest matching stored interpretation; and providing the person's predicted geolocation based movement to an entity.

* * * * *